US012613414B2

(12) United States Patent
Marcellin-Dibon et al.

(10) Patent No.:  US 12,613,414 B2
(45) Date of Patent:  Apr. 28, 2026

(54) SYSTEMS AND METHODS FOR OPTICALLY DISPLAYING AT A SET OF SPECTACLES

(71) Applicant: MICROOLED, Grenoble (FR)

(72) Inventors: Eric Marcellin-Dibon, Vaucresson (FR); Cédric Siourakan, Grenoble (FR)

(73) Assignee: MicroOled, Grenoble (FR)

( * ) Notice: Subject to any disclaimer, the term of this patent is extended or adjusted under 35 U.S.C. 154(b) by 475 days.

(21) Appl. No.: 18/091,945

(22) Filed: Dec. 30, 2022

(65) Prior Publication Data

US 2023/0168515 A1      Jun. 1, 2023

Related U.S. Application Data

(63) Continuation-in-part of application No. 16/472,738, filed as application No. PCT/FR2017/053764 on Dec. 21, 2017, now Pat. No. 12,282,171.

(30) Foreign Application Priority Data

Dec. 22, 2016     (FR) ...................................... 1663159

(51) Int. Cl.
G02B 27/00          (2006.01)
G02B 27/01          (2006.01)
G02B 27/09          (2006.01)

(52) U.S. Cl.
CPC ..... G02B 27/0172 (2013.01); G02B 27/0149 (2013.01); G02B 27/0977 (2013.01);
(Continued)

(58) Field of Classification Search
CPC ............ G02B 27/0172; G02B 27/0149; G02B 27/0977; G02B 2027/0138;
(Continued)

(56) References Cited

U.S. PATENT DOCUMENTS 6,394,601 B1     5/2002  Bettinger
10,025,093 B2    7/2018  Wall et al.
(Continued)

FOREIGN PATENT DOCUMENTS

EP          2698662 A1     2/2014
FR          2515832 A1     5/1983
(Continued)

OTHER PUBLICATIONS

International Search Report (w/translation) & Written Opinion mailed Mar. 21, 2018 for PCT/FR2017/053764 [14 pages].

*Primary Examiner* — Henry Duong
(74) *Attorney, Agent, or Firm* — IceMiller LLP

(57)          ABSTRACT

Spectacles, comprising a face defining a passage for a nose of a user, may be provided with a lens-type optical unit. Internal edges may define the face, the edges being respectively turned toward lateral edges of the face. The spectacles may comprise a module for emitting visual information and a geometric element for returning the converted visual information, including towards a target zone of the optical unit. The emitting module may be placed at the bottom or top portion of an internal edge of the face, whereas a geometric return element may be placed in the top or bottom portion. The return element may be placed at the top portion of one internal edge when the emitting module is placed at the bottom portion of the one internal edge. And the return element may be placed at the bottom portion when the emitting module is placed at the top portion.

10 Claims, 20 Drawing Sheets

(52) U.S. Cl.
    CPC ................ *G02B 2027/0138* (2013.01); *G02B 2027/0169* (2013.01); *G02B 2027/0178* (2013.01)

(58) Field of Classification Search
    CPC .... G02B 2027/0169; G02B 2027/0178; G02B 27/017; G02B 27/0176; G02B 27/0101; G02B 2027/0145
    USPC ........................................................ 359/633
    See application file for complete search history.

(56)                References Cited

U.S. PATENT DOCUMENTS

| | | |
|---|---|---|
| 11,227,294 B2 | 1/2022 | Nortrup et al. |
| 2003/0184868 A1 | 10/2003 | Geist |
| 2013/0222214 A1* | 8/2013 | Takeda .................... G02B 5/18 |
| | | 345/8 |
| 2015/0042544 A1 | 2/2015 | Sugihara et al. |
| 2015/0205112 A1 | 7/2015 | Border |
| 2015/0309316 A1 | 10/2015 | Osterhout et al. |
| 2016/0048025 A1* | 2/2016 | Cazalet ............. G02B 27/0176 |
| | | 351/116 |
| 2016/0306171 A1 | 10/2016 | Rudolph et al. |
| 2017/0318281 A1* | 11/2017 | Edlund .................. G03B 35/18 |
| 2018/0011322 A1 | 1/2018 | Leighton et al. |
| 2019/0215611 A1* | 7/2019 | Lou ........................ G06F 1/3231 |

FOREIGN PATENT DOCUMENTS

| | | |
|---|---|---|
| FR | 3017966 A1 | 8/2015 |
| WO | 2016/135757 A1 | 9/2016 |
| WO | 2018/115762 A1 | 6/2018 |

* cited by examiner

20mm

213

SYSTEMS AND METHODS FOR OPTICALLY DISPLAYING AT A SET OF SPECTACLES

CROSS-REFERENCE TO RELATED APPLICATIONS

This application is a continuation-in-part of U.S. patent application Ser. No. 16/472,738, filed on Jun. 21, 2019, which is a national stage entry of PCT/FR2017/053764, filed internationally on Dec. 21, 2017, which claims priority to foreign European patent application No. EP 1663159, filed on Dec. 22, 2016, the disclosures of which being all incorporated by reference in their entireties herein.

TECHNICAL FIELD

The invention relates to the field of optical systems, and more specifically optical display systems integrated in a helmet or a pair of spectacles (called "connected spectacles").

BACKGROUND

Various models of head-mounted displays that make it possible to view "virtual reality" are known, such as the Oculus Rift™ system on the market. They are bulky and do not make it possible to view the external environment at the same time. Helmets with a so-called head-up display are also known, which make it possible to view external reality at the same time. So-called connected spectacles with an optical display system are also known. The optical principles of these devices are presented in the article "Head-Worn Displays: A Review" by O. Cakmakci and J. Rolland, published in 2006 in the Journal of Display Technology 2 (3), pages 199-216. A large number of patent documents propose different configurations.

These spectacles are generally rather bulky and heavy. They are specific objects that are unsuitable for common use. Their design is significantly different from that of common spectacles, whether spectacles with corrective lenses or sunglasses. As an example, the documents WO 2016/135 727 (Elbit Systems) and US 2009/0231 722 (Day & Night Display Systems) propose positioning the display system horizontally over the bridge of the nose. This positioning is incompatible with common spectacles. Spectacles with waveguides in the stems have been described in WO 2015/075206 (Carl Zeiss Optics); they require the use of a set of prisms in order to extract light from the spectacle lenses, which downgrade transparent vision.

Numerous documents describe displays integrated in spectacles in which the frames are more similar to those of common spectacles for seeing.

The document FR 3 017 966 (O. Cecconi) proposes integrating a micro-screen in each of the two pads intended to hold the frame on the nose; each screen projects an image into the eye of the spectacle wearer by means of the internal (rear) diopter of the spectacle lens, which must then have a very specific curve.

The document US 2003/0184 868 (Geist) describes a system in which the display, arranged on the stem of a pair of spectacles, sends an image to a first mirror attached to one of the pads of the spectacles, then to a second mirror attached to the spectacle lens, from which the image is projected into the user's eye. This second mirror, close to the pad, is at a distance from the center of the spectacle lens, and thereby requires significant movement of the eyes in order to see the image coming from the system.

The document U.S. Pat. No. 6,394,601 (Bettinger) describes a system including a display, attached to the top portion of the spectacle lens with its emitting surface positioned perpendicularly to the plane of the lens, which sends an image to a mirror located at the bottom portion of the lens, from which the image is reflected into the eye of the user. No concrete example is presented, and it may be thought that the display located at the upper edge of the spectacle lenses is rather bulky. This system also has the disadvantage of the image always being perceived at the periphery of the spectacle lens, requiring eye movements that obstruct a clear view of the environment.

The problem to be solved by the present invention is that of providing a spectacle system in which the optical system allowing the display is designed so as to reduce the space occupied by the optical system ensuring the display function, while optimizing the usual characteristics (size, compactness, lightness, curve of the lenses, frame, design) of a pair of common spectacles, and in particular a pair of sports glasses, and so as not to obstruct the view of the environment.

SUMMARY

The invention is based on a "pair of spectacles" having at least one spectacle lens-type optical unit including a face defining a passage for the user's nose and means for attachment to the user's head. Said optical unit has a front diopter for "external" diopter, seen from the front) and a rear diopter (or "internal" diopter, directed toward the user's face). The attachment means may be spectacle stems or any other suitable means.

According to the invention, these objectives are achieved with spectacles including a face provided with at least one lens-type optical unit, said face defining a passage for the user's nose, said passage for the nose being defined by first and second so-called internal edges of the face, said spectacles also including: a module for emitting visual information, including an element for emitting said display-type visual information, optionally an element for optical transformation of said emitted visual information, in particular of the lens type, a mirror-type element for geometric reflection of the transformed visual information, capable of reflecting said transformed visual information to a target area of said lens-type optical unit, said emitting module being arranged at the bottom or top portion of a first internal edge of the face, while the geometric reflection element is arranged at the top or bottom portion of said first internal edge, with the understanding that when said emitting module is arranged at the bottom portion of said first internal edge of the face, then the geometric reflection element is arranged at the top portion of said first internal edge, and when said emitting module is arranged at the top portion of a first internal edge of the face, then the geometric reflection element is arranged at the bottom portion of said first internal edge.

Typically, said first and second internal edges of the face are turned respectively toward the first and second lateral edges of the face.

In one embodiment, the spectacles include stems mounted on said face (for example on first and second lateral edges of said face), in particular in a pivoting manner. In another embodiment, they are integrated, in a fixed or pivoting manner, in a helmet for protecting the head, in particular in an approved bicycle helmet or in an approved motorcycle helmet.

Advantageously, the main surface of the display-type emitting element is oblique (in particular substantially perpendicular) to the main surface of said face.

The invention uses the available space near the joint of the nose in order to position the emitting module and/or the geometric reflection element. More specifically, one or the other of these two devices (namely the emitting module or the geometric reflection element) may be positioned below the eyebrow, near the nasal bone, and the other may be positioned near the lower lacrimal punctum. This positioning of the emitting module and the geometric reflection element makes it possible to minimize the bulk and the obstruction that they cause for the user. This positioning also promotes the projection of a high-quality image with a sufficiently wide field, and prevents direct vision from being obstructed by the emitting module or the geometric reflection element.

Said target area is located on the rear diopter of said optical unit. It is preferably located at the median portion of said first lateral edge, thereby preventing the direct vision of the eye from being obstructed by the display.

In one embodiment, said face includes two rims and a bridge connecting said rims, each rim including attachment means, in particular removable, for said lens-type optical unit, each rim including a lateral edge and an internal edge, respectively forming one of said lateral edges and one of said internal edges of the face. Said rims connected by the bridge may form a known type of spectacle frame.

In a first alternative ("alternative 1"), said emitting module and/or said geometric reflection element is mounted on the rim.

In a second alternative ("alternative 2"), said emitting module and/or said geometric reflection element is (are) mounted not on the rim, but attached directly to said lens.

In a third alternative ("alternative 3"), capable of being combined with alternatives 1 or 2, said frame is designed to receive in each rim a lens-type optical unit.

In a fourth alternative ("alternative 4"), capable of being combined with alternatives 1 or 2, said frame is designed to hold a single optical unit that extends over the two rims.

In a fifth alternative ("alternative 5"), capable of being combined with all of the above alternatives, the stems and/or the bridge are mounted directly on said optical unit(s).

In another embodiment, said face includes an optical unit, the lateral edges of said optical unit forming said lateral edges of the face, said stems being mounted directly on the lateral edges of said optical unit.

In particular, the emitting module may be mounted on the rim, at the bottom portion of a first edge of the face, or directly on the lens-type optical unit. Similarly, the geometric reflection element may be mounted on the rim, at the bottom portion of a first edge of the face, or directly on the lens-type optical unit. In one embodiment, the emitting module and the geometric reflection element are both mounted on the rim, one at the bottom portion, the other at the top portion (in a first alternative, the emitting module is at the top portion, in a second alternative it is at the bottom portion). In another embodiment, the emitting module and the geometric reflection element are both mounted on the lens-type optical unit (by assembly techniques known as such), one at the bottom portion, the other at the top portion (in a first alternative, the emitting module is at the top portion, in a second alternative, it is at the bottom portion). In another embodiment, the emitting module is mounted on the rim while the geometric reflection element is mounted on the lens-type optical unit, one at the top portion, the other at the bottom portion (in a first alternative, the emitting module is at the top portion, in a second alternative, it is at the bottom portion). In yet another embodiment, the emitting module is mounted on the lens-type optical unit while the geometric reflection element is mounted on the rim, one at the top portion, the other at the bottom portion (in a first alternative, the emitting module is at the top portion, in a second alternative it is at the bottom portion).

According to an advantageous feature of the invention, said bridge forms part of a bridge module to which said optical block is attached. Said bridge module advantageously includes an electrical connection socket. Said frame may also have an element for optical transformation of said emitted visual information, in particular of the lens type; it is possible to use a number of these elements, for example two.

According to an advantageous feature of the invention, the spectacles also include an optical block, said block including holding means, in particular removable, for the emitting module and/or the optical transformation element and/or the geometric reflection element, said optical unit being provided with positioning means capable of positioning said optical block with respect to said optical unit.

In a first embodiment, the positioning means include at least one positioning element integrated, in particular integrally molded, with said optical unit, said positioning element being capable of cooperating with said optical block, in particular by a mortise and tenon-type connection, or by a resilient snap-lock connection.

In another embodiment, said optical block is integrated, in particular integrally molded, with said optical unit.

Another object of the invention is a frame belonging to spectacles according to the invention, said frame including two rims and a bridge connecting said rims, each rim including attachment means, in particular removable, for a lens-type optical unit, said frame also including: a visual information emitting module, including a display-type visual information emitting element, an element for optical transformation of said emitted visual information, in particular of the lens type, a mirror-type element for geometric reflection of the transformed visual information, capable of sending said transformed information to a target area of said lens, said emitting module being mounted at the bottom or top portion of a first internal edge of the frame, while the geometric reflection element is mounted at the top or bottom portion of said first internal element, with the understanding that when said emitting module is mounted at the bottom portion of said first internal edge of the frame, then the geometric reflection element is mounted at the top portion of the first internal edge, and when said emitting module is mounted at the top portion of a first internal edge of the frame, then the geometric reflection element is mounted at the bottom portion of said first internal edge.

The target area is advantageously located at the median portion of the lateral edge of said first rim. The main surface of the display-type emitting element is substantially perpendicular to the main surface of said first rim.

Advantageously, the total field of the screen (represented by the lens-type optical unit) makes it possible to cover multiple positions of the pupil.

The image provided by the visual information emitting module may be monochromatic or polychromatic.

In one embodiment that can be combined with all of the other embodiments and alternatives, the spectacles include an electronic system for detecting the ambient brightness, configured to control the brightness of the display in real time according the ambient brightness of the environment.

In another embodiment that can be combined with all of the other embodiments and alternatives, the geometric reflection element is mounted on an adjustable support by means of a control member making it possible to move the mirror in translation by several micrometers while preferably maintaining a constant angle between the display and the surface of the lens-type optical unit.

As an alternative to the above embodiment (or less preferably, as a complement to the above embodiment), it is the display (preferably with its element for optical transformation of visual information) that is mounted on an adjustable support by means of a control member making it possible to move the display in translation (preferably with its element for optical transformation of visual information) so as to be capable of adjusting the focal point and the diopter; this makes it possible to at least partially compensate for certain visual defects of the user, such as myopia or hyperopia.

In general, in the context of the present invention: said element for optical transformation of visual information advantageously includes at leas: one lens, preferably aspherical, thereby reducing the aberration; said geometric reflection element advantageously includes at least one mirror, which may in particular be a flat or convex mirror, and which may have a circular, oval, oblong, rectangular or square shape (preferably with rounded edges), with the understanding that shapes without corners are preferred because they are less bulky and easier to integrate with the support; said visual information emitting module is preferably an OLED-type display, which may be a monochromatic or color display. It is possible to use in particular a micro-display as sold by the Microoled™ company in Grenoble; said emitting module with its geometric reflection element may be placed identically on the left- or right-handed portion of the spectacles, according to the dominant eye of the user.

It should be specified that, in the context of the present invention, the term "lens" in the expression "lens-type optical unit" must be understood as an "spectacle lens" and not as an indication of a specific material: in fact, said "lens" may be made of any suitable material, such as so-called organic glass, for example a polycarbonate such as allyl diglycol carbonate (a resin known by the abbreviation "CR-39"), a plastic film, a mineral glass, and may or may no: allow for optical correction, and/or may or may not absorb at least a portion of the visible light spectrum (sunglasses), and/or may or may not be colored, with the understanding that said functionalities (and others, such as scratch-resistant, anti-fog, polarizing and semi-reflective surface functions may be intrinsic to the "lens" materials used and/or may be obtained owing to one or more suitable surface coatings. In fact, the lens-type optical unit used in the context of the present invention may be a known type of unit in the eyewear field.

The word "spectacles" is used here in the plural to designate a singular object (as shown in the figures) or an object in the plural, as said word "spectacles" is derived from the expression "a pair of spectacles".

BRIEF DESCRIPTION OF THE DRAWINGS

The invention will be described below in reference to FIGS. 1 to 15, provided solely as non-limiting examples, wherein.

DETAILED DESCRIPTION

Figures 1, 2A:
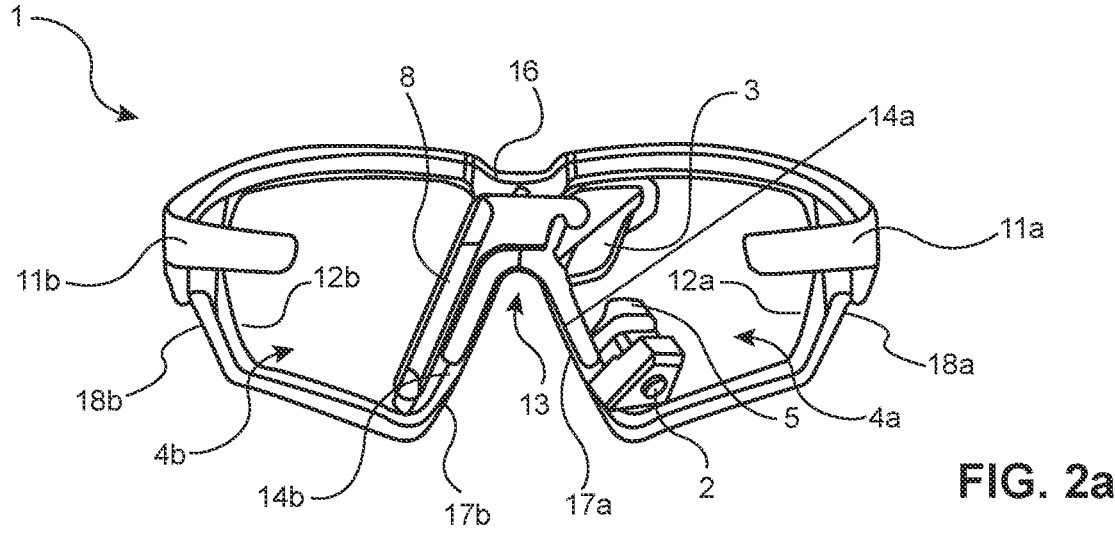
FIG. 1 shows a front view of an embodiment of the spectacles according to the invention, integrated in a bicycle-type helmet.
FIG. 2a shows another embodiment of the spectacles according to the invention, seen from the interior.

The following numeric references are used in the present description:

TABLE 1

| 1, 213 | Spectacles (e.g., Sunglasses) |
| --- | --- |
| 2 | Display |
| 3 | Mirror |
| 4 | Lens-type optical unit |
| 5 | Lens |
| 6 | Target area |
| 7 | Eye |
| 8 | Electronic housing |
| 9 | Attachment of mirror 3 |
| 10 | Face of the spectacles |
| 11 | Means for attaching spectacles 1 |
| 12 | Lateral edge of face 10 |
| 13 | Passage for the nose |
| 14 | Internal edge of face 10 |
| 15 | Rim |
| 16 | Bridge |
| 17 | Internal edge of rim 15 |
| 18 | Lateral edge of rim 15 |
| 19 | Helmet |
| 20 | Display attachment 2 |
| 21, 202 | Optical system (e.g., block) |
| 22 | Cap of the optical block |
| 23 | Spacers |
| 24 | Positioning and protection elements |
| 25 | Nose support |
| 30, 31, 32 | Mechanical positioning elements |
| 40, 201 | Bridge (e.g., electronic) module |
| 41 | Removable nose support |
| 42 | Socket |
| 43 | Connector |
| 44 | Electronic housing |
| 203 | Nose pads |
| 204, 207 | USB power |
| 205, 206 | USB data |
| 208 | On/Off button |
| 209, 210 | Magnets |
| 211 | Double-sided tape |
| 212 | Mask pin |
| 214 | Screw |
| 215 | Opening |
| 216, 217 | Snaps |
| 301 | Mask lens (e.g., sunglasses) |
| 302 | Attachment plate for magnet |
| 303 | Body (e.g., nose) detection |
| 304 | Magnet inside electronic casing |
| 305 | Protrusion |

Embodiments of the invention will be described in greater detail below, in particular in relation to the figures.

FIG. 1 shows a front view of an embodiment of spectacles 1 according to the invention, integrated in helmet 19 of the bicycle helmet type. The spectacle lens-type optical unit 4 has passage 13 for the nose; therefore, it is closer to the face than the visor in motorcycle helmet-type visored helmets. It is this proximity of the optical unit 4 with respect to the eye 7 that creates the need for a compact display system that is not bulky or obstructive. In this embodiment, geometric reflection element 3 is a mirror, attached by means of attachment point 9 to optical unit 4 at the top portion of optical unit 4, near the eyebrow and the nose of the wearer. Emitting module 2 is attached by means of an attachment point 20 to optical unit 4, at the bottom portion of optical unit 4 near the nose. An optical transformation element 5 is located in the optical path that leads from emitting module 2 to geometric reflection element 3. The image is projected onto the interior diopter of optical unit 4 and reflected into the eye of the user.

In this embodiment, optical unit 4 is attached directly to helmet 19. The attachment means may be a groove provided in the lower portion of the helmet, into which the upper edge of the optical unit is inserted over the entire length thereof, or (as in the helmet shown in community design model no. 000 175 955-0001) a hinge on each side that pivotably connects optical unit 4 to helmet 19 so that it can be opened by pivoting upward.

Figure 2B:
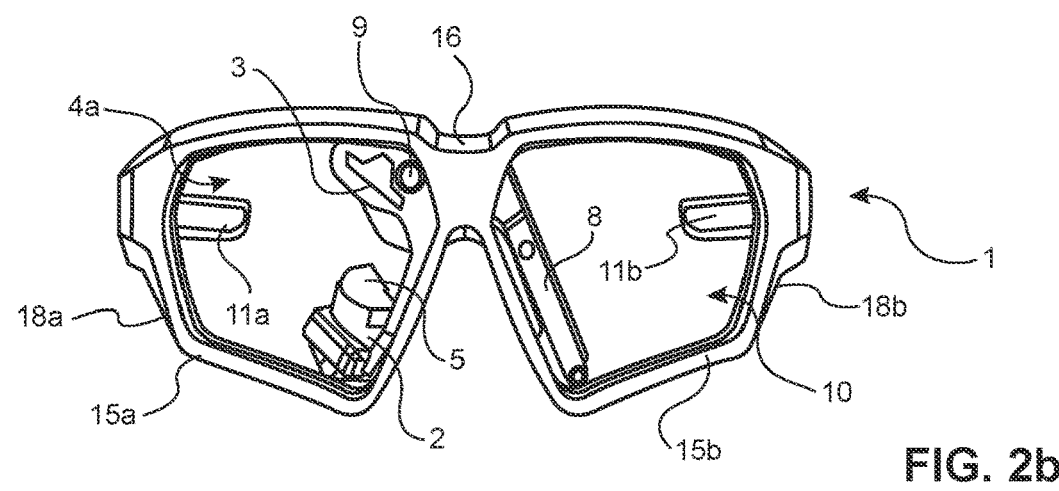
FIGS. 2b-2c show other embodiments of the spectacles according to the invention, seen from the front.
Figure 2C:
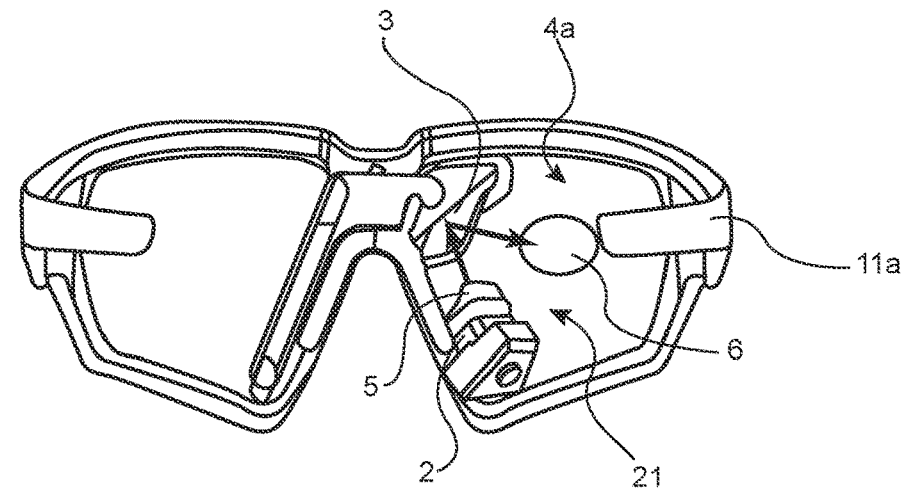
Figure 2D:
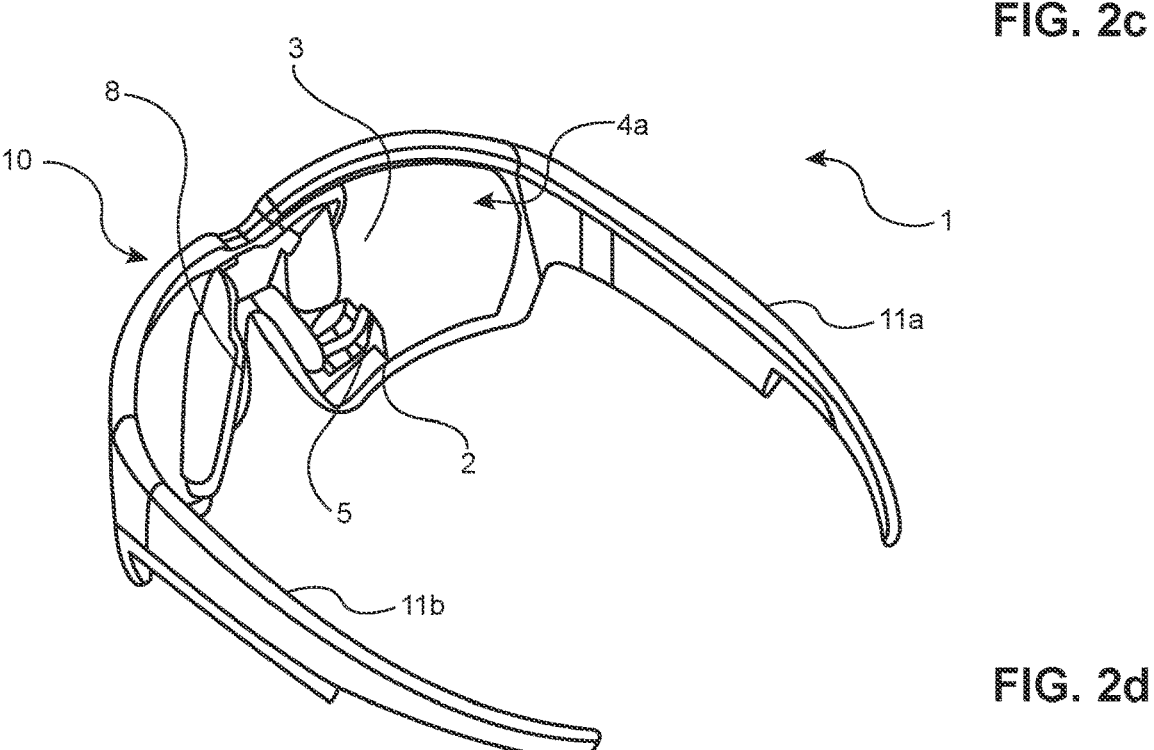
FIG. 2d shows another embodiment of the spectacles according to the invention, seen in perspective from the interiors.

FIGS. 2a, 2b, 2c and 2d show another embodiment that is based on a pair of common spectacles. FIG. 2a is a view from behind (i.e. the user's perspective), FIG. 2b is a front view, FIG. 2d is a perspective view from behind, and FIG. 2c is similar to FIG. 2a, but with arrows representing the optical path of the image showing the emitted visual information, and a gray area representing target area 6 onto which said visual information is projected on the interior of optical unit 4 a represented by the lens.

As shown in FIG. 2b, the spectacles include two rims 15a,b connected by a bridge 16, providing passage 13 for the nose of the wearer. Each rim 15a,b is equipped with means for attachment 11a,b of spectacles 1, 213 to the wearer's head, in this case a spectacle stem.

More specifically, each rim 15a,b includes a lateral edge 18a,b and an internal edge 17a,b, a stem 11a,b being mounted on said first and second lateral edges 18a,b of rim 15a,b. Each rim 15a,b includes a lens-type optical unit 4a,b. Rims 15a,b and the lens-type optical unit 4a,b together form the face 10 of spectacles 1, 213.

According to the invention, spectacles 1, 213 include an emitting module 2 and an element for geometric reflection of visual information 3, which may be a mirror. The visual information (which will hereinafter also be referred to as "the image") emitted by emitting module 2 undergoes an optical transformation by means of optical transformation element 5, in this particular case a lens that it passes through before arriving at said geometric reflection element 3. The image is projected onto the internal face of the spectacle-type optical unit 4 a, from where it is reflected into the eye 7 of the spectacle wearer. Optical transformation element 5 makes it possible, on the one hand, to enlarge the image and, on the other hand, to correct the optical aberrations after reflection on the internal face of the spectacle lens 4 a. Optical transformation element 5 may be a lens (or multiple lenses positioned between emitting module 2 and geometric reflection element 3), or it may be integrated in said geometric reflection element 3, which may be an aspherical mirror.

Geometric reflection element 3 may be attached to optical unit 4a by means of attachment point 9.

Figures 12A, 12B:
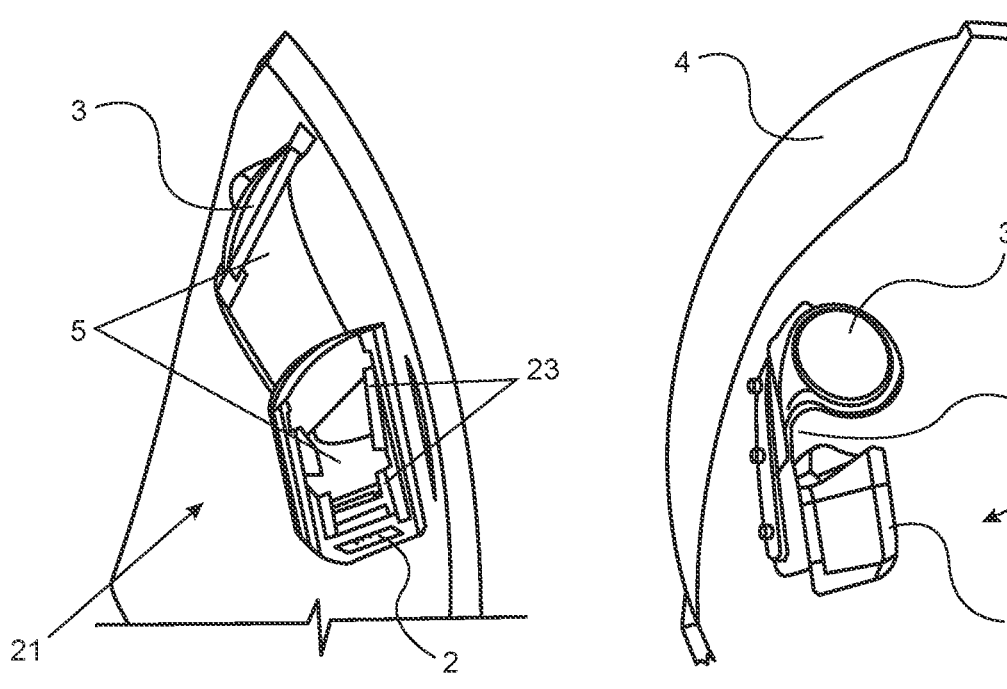
FIG. 12a shows a view of an optical module according to the invention, including a longitudinal cross-section view.
FIG. 12b shows a view of an optical module according to the invention, including a perspective view of the cap.
Figure 19:
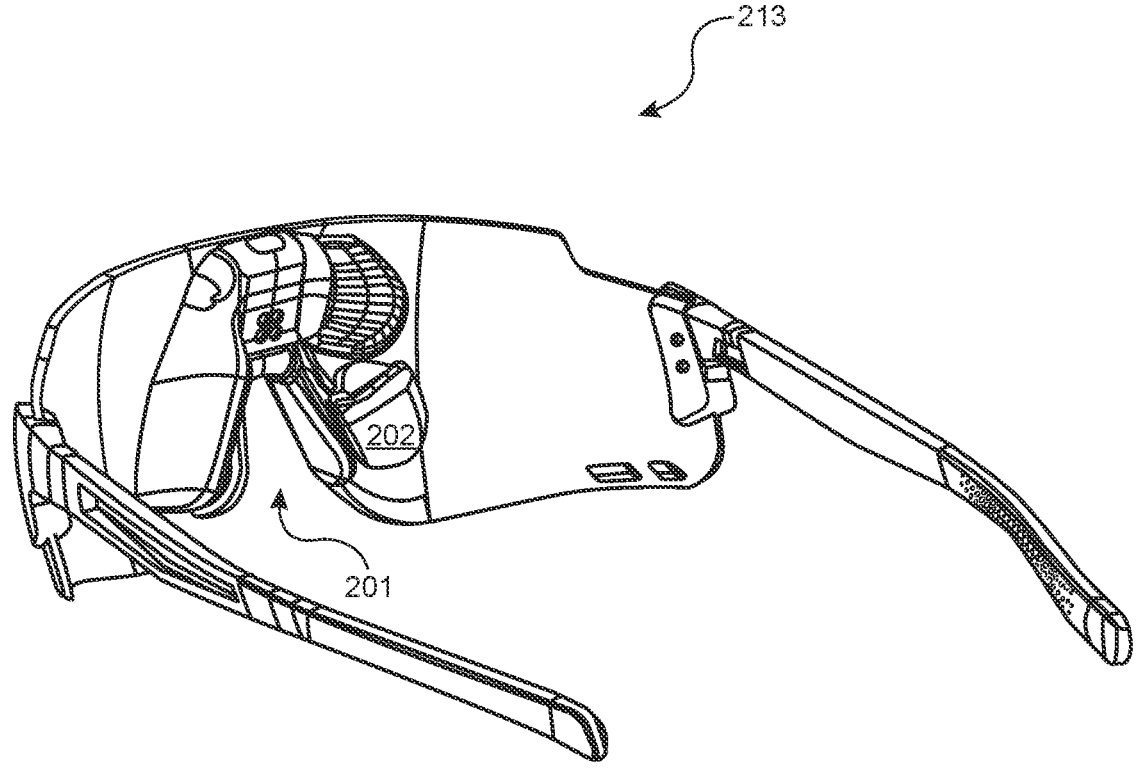
FIGS. 19-20 and 24-25 show a set of magnets enabling a snap connection to a set of spectacles, in accordance with one or more embodiments.
Figure 20:
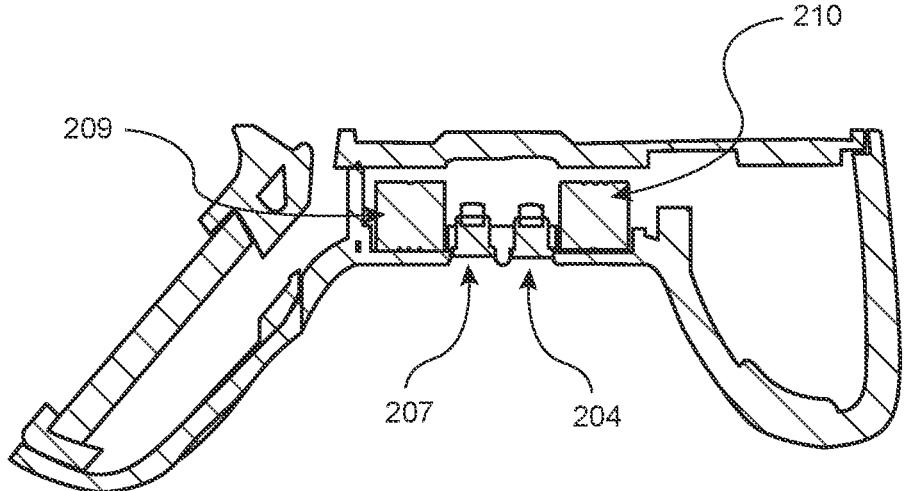

Emitting module 2 and optical transformation element 5 may be integrated in the same housing or block, which will hereinafter be referred to as the "optical block"; it is designated by reference 21 in FIG. 2c (and reference 202 in FIGS. 17, 19, and 24). FIG. 12 shows two views of said optical block: longitudinal cross-section (FIG. 12(a)) and perspective (FIG. 12(b)), with the cap 22 in place. In this embodiment, optical block 21 includes display 2, two optical lenses 5 separated by mechanical spacers 23, and mirror 3 connected to a mechanical positioning and protection element 24.

In the embodiment of FIG. 2, emitting module 2 is mounted at the bottom portion of a first internal edge 14a of the face 10, while geometric reflection element 3 is mounted at the top portion of said first internal edge 14a.

If the spectacles have a frame with a rim, the internal edges 17a,b of the rim may coincide with the internal edges 14a,b of the face, and the lateral edges 18a,b of the rim may coincide with the lateral edges 12a,b of the face. The stems 11a,b may be mounted on the first and second lateral edges 12*a,b* of the face or one the first or second lateral edges 18*a,b* of the rim, or may be attached to another place on the face 10, in particular to rim 15*a,b* or directly to the lens-type optical unit 4.

The electronic components and cards for controlling visual information emitting module 2 and/or the electrical energy storage elements (typically one or more batteries, not shown in the figures) that supply the electronics for controlling emitting module 2 and/or said emitting module may be housed in an electronic housing 8 and/or in one and/or the other of the spectacle stems 11 *a,b* and connected by a flexible cable (commonly called a "flex"), not shown in the figures.

In an embodiment that may be combined with all of the other embodiments described herein, said face 10 and/or said lens-type optical unit 4 includes a semitransparent photovoltaic cell that supplies, directly or by means of batteries, the control electronics and/or said visual information emitting module 2. Such semitransparent photovoltaic cells are known in the prior art.

Figure 3A:
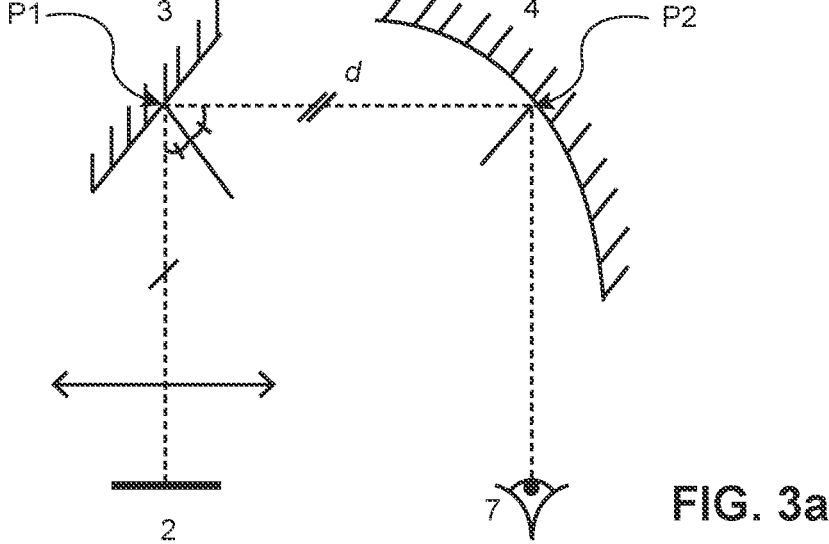
FIGS. 3a-3b show a simplified diagram of the 2D geometric optics of the display system of the spectacles according to the invention, for two different inclinations of the mirror.
Figure 3B:
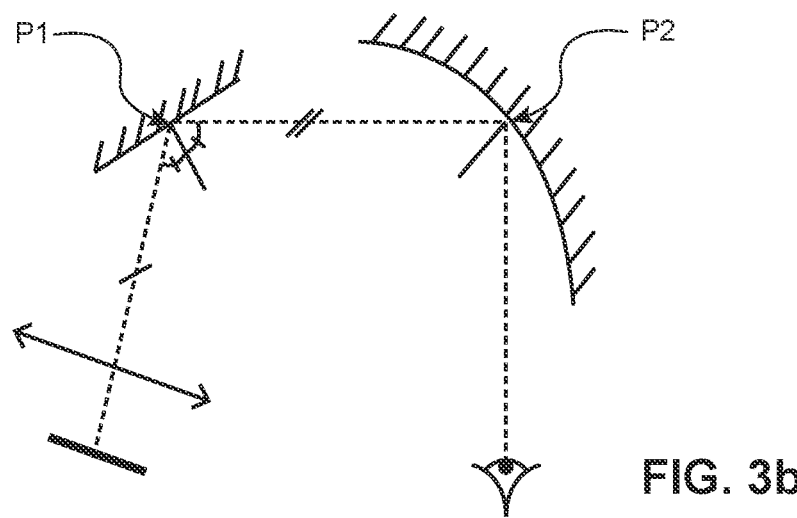

FIG. 3 shows, in a simplified and schematic manner, the 2D geometric optics of the display system of the spectacles according to the invention, for different adjustments of the emitting module 1 (with its optical transformation element 5) and geometric reflection element 3 (FIGS. 3*a* and 3*b*). In these adjustments, the distance d between the point of impact P1 on geometric reflection element 3 of the incident optical beam coming from the visual information emitting element 2, on the one hand, and starting point P2 of the optical beam reflected by optical unit 4 advantageously remains constant, and the angle of reflection on optical unit 4 advantageously remains constant. This figure shows the possibility of modifying the positioning of emitting module 2 when designing spectacles or in the fine-tuning of the position of the point P2 on optical unit 4. Advantageously, during these adjustments, the length dl does not change significantly, so as not to modify the focusing of the image coming from the module 2.

Figure 4A:
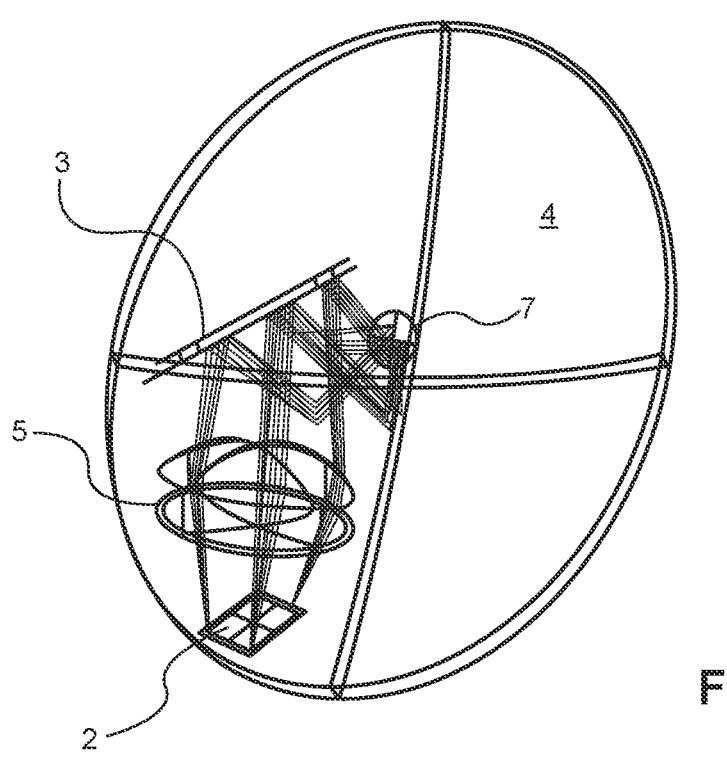
FIGS. 4a-4b show two different views of a simplified diagram of the 3D geometric optics of the display system of the spectacles according to the invention.
Figure 4B:
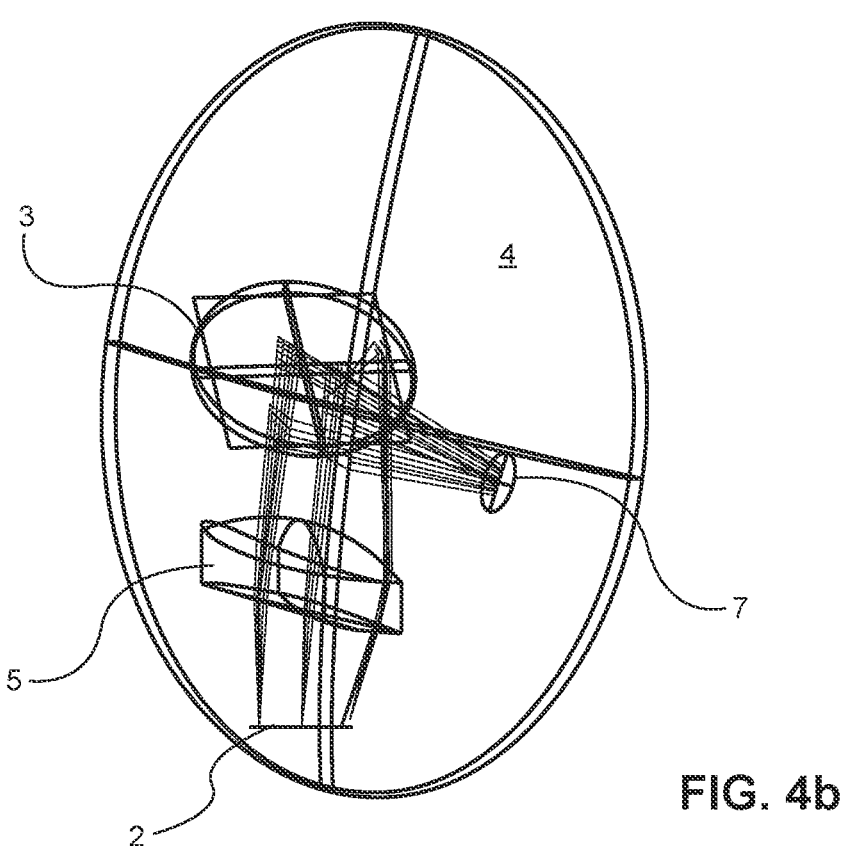

FIG. 4 shows, in a simplified and schematic manner, the 3D geometric optics of the display system of the spectacles according to the invention, with two different views (FIGS. 4*a* and 4*b*). It shows the role of optical transformation element 5, which is in this case a lens, but which may, in an alternative (shown in FIG. 5), include two lenses.

Figures 5A, 5B:
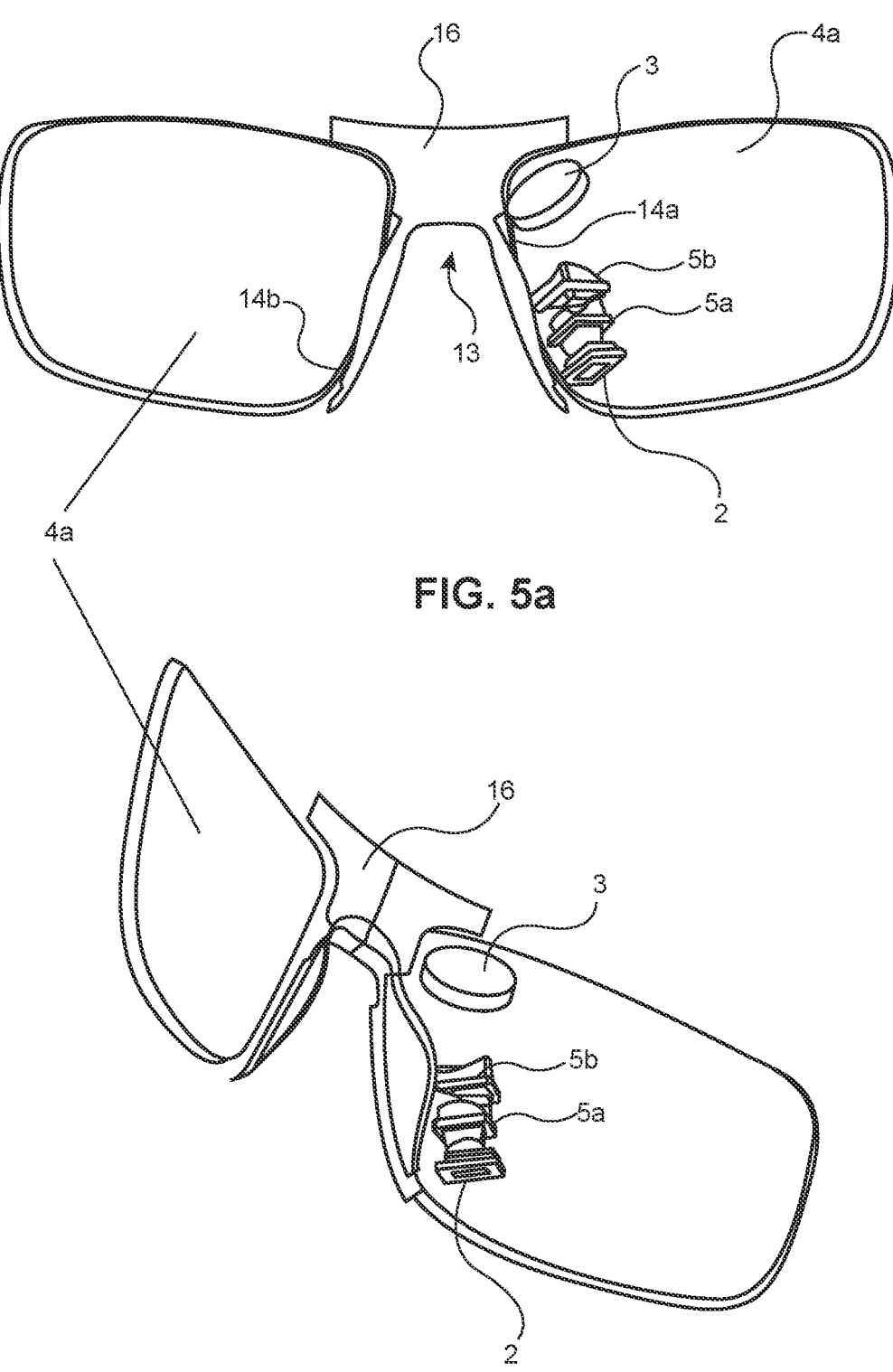
FIGS. 5a-5b show two different simplified schematic views of an embodiment with two lenses.

FIG. 5 shows a partial view of the spectacles according to the invention (the stems and the rim have been omitted so as not to encumber the figure) in which the element for optical transformation of the visual information generated by emitting module 2 includes two lenses 5 *a,b*. FIG. 5*b* is rotated 450 with respect to FIG. 5 *a*.

Figure 6A:
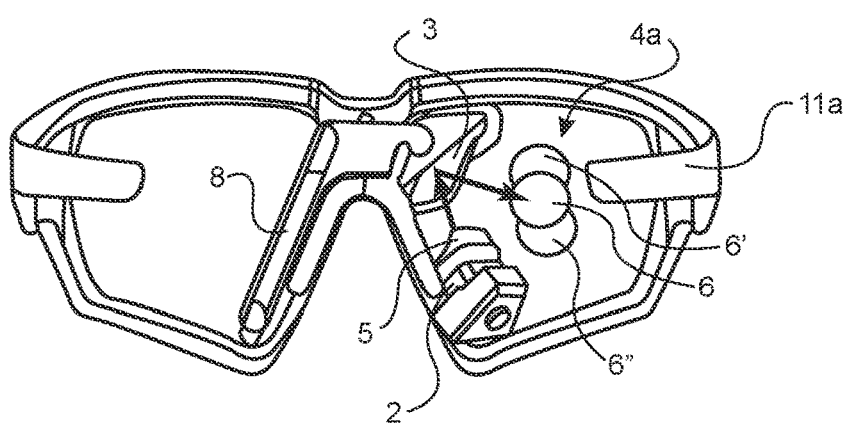
FIG. 6a shows the spectacles of FIG. 2 with three different target areas moved vertically.
Figure 6B:
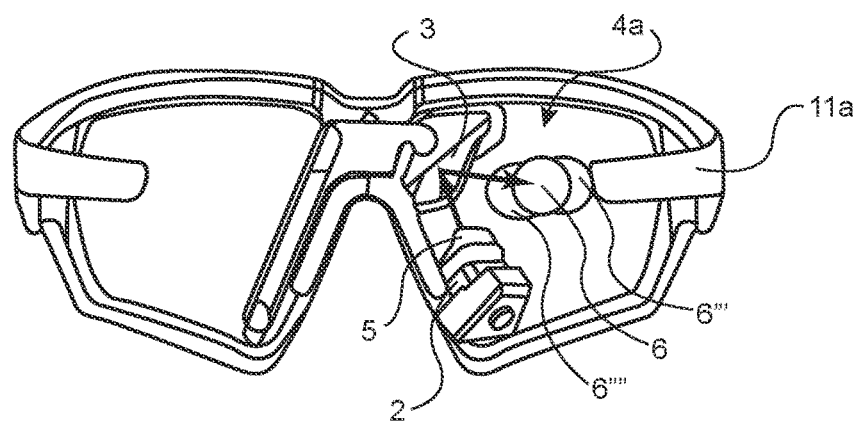
FIG. 6b shows the spectacles of FIG. 2 with three different target areas moved laterally.

FIG. 6 shows the spectacles of FIG. 2 in which target area 6 is offset. In FIG. 6*a*, target area 6 is offset upward (target area 6') or downward (target area 6"), in FIG. 6*b* it is moved laterally outwardly (target area 6"') or inwardly target area 6""'. It is also possible to envisage a movement that combines these two types of movement. The choice of the positioning of target area 6 on the surface of optical unit 4 is made according to the intended use of the spectacles. The adjustment of this position may be performed in the factory or by the optician, or by the user him or herself. In one particular embodiment, geometric reflection element 3 is mounted on an adjustable support (not shown in the figures) by means of a control member (not shown in the figures) making it possible to move said geometric reflection element 3 in translation by several micrometers while preferably maintaining a constant angle between display 2 and the surface of the lens-type optical unit 4.

Figure 7:
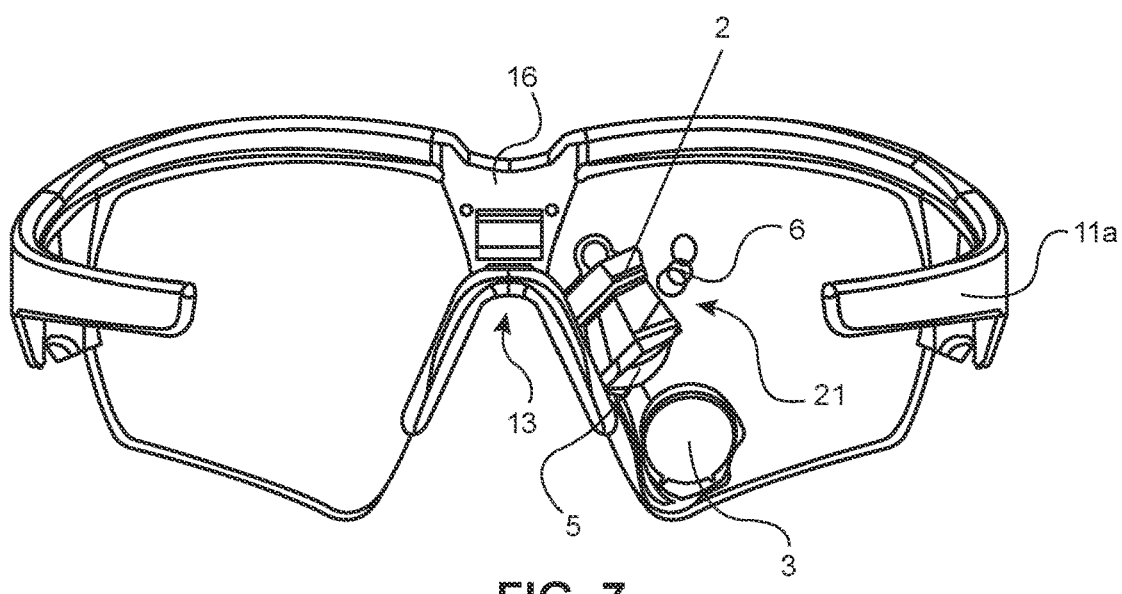
FIG. 7 shows a schematic view of another embodiment of the invention, seen from the interior.

FIG. 7 shows the spectacles according to the invention in which the configuration of display 2 and of mirror 3 is inverted with respect to the embodiment of FIG. 2: display 2 is located at the top portion (near the eyebrow) and mirror 3 is located at the bottom portion.

The spectacles according to the invention may be made with or without a rim, or with a partial rim (for example, only at the top or only at the bottom). If the spectacles do not have a rim, face 10 is formed by the lens-type optical unit 4*a,b*, as in FIG. 1. The bridge 16 may or may not be present, and optical unit 4 may consist of a single part that provides passage 13 for the nose, as in the embodiment shown in FIG. 1. Similarly, the frame may have pads (not shown in the figures) close to passage 13 for the nose, in order to stabilize the spectacles on the wearer's nose; these pads then form part of face 10. All of these types of spectacles and frames are known as such, and it is a feature (and an advantage) of the present invention that it can be carried out with common frames, or at least with frames that are aesthetically similar to common frames. The main constraints are as follows: the frame or the face must actually make it possible to have the emitting module and the geometric reflection element at the top or bottom portion of an internal edge of the face, and the spectacles must be adapted so as to receive, on the one hand, an electrical energy storage element and, on the other hand, the electronics for control of the emitting module. To achieve these objectives it may for example be necessary to choose stems 11 having a particular shape and/or size, making it possible to provide a housing for receiving said energy storage element and/or said control electronics, and/or to provide an electronic housing 8.

Numerous alternatives are possible in the realization of the invention; these alternatives may be combined with all of the embodiments described herein, and may be combined with one another.

For example, optical layers deposited at the surfaces of geometric reflection element 3 and/or the spectacle lens (dichroic or antireflective) may improve the reflection rate as a function of the emitting wavelengths of the display and reduce parasitic reflections.

To increase the contrast of the system, the optical layers on the interior surface of the lens may be complemented by a reflective layer with a complementary color on the external face of the lens, and/or by a layer absorbing the complementary color, and/or by the choice of a lens absorbing complementary color. This makes it possible to reduce the parasitic reflections in the lens, and to increase the contrast. Similarly, it is possible to tint the lens with the complementary color in order to obtain the same effect, and/or to add a sunglasses function.

The curves of the internal and external surface of the lens may be adjusted so as to provide an ophthalmic correction for the spectacle wearer. The internal surface makes it possible to correct the vision of the virtual image projected by the display device, and the combination of the internal and external surface makes it possible to correct the natural vision of the spectacle wearer.

The mirror may have any shape, but shapes without corners, in particular circular or oval shapes, are preferred, leaving a free field sufficient for the reflection of the image in order to reduce its bulk and be better integrated with the support.

It is possible to provide means for adjusting the focal point between the mirror and the display with a mechanical support of the mirror, adjustably attached to the support of the frame. Thus, by screwing or unscrewing the mirror, the mirror can be moved in translation by several micrometers while maintaining an identical angle between the display and the spectacle lens.

It is also possible (alternatively or as a complement to the above embodiment) to provide means for adjusting the focal point and the diopter with a mechanical support of the display, adjustably attached to the support of the frame. Thus, by screwing or unscrewing the display (and preferably simultaneously lens 5 or lenses, mounted on the same optical block 21, 202 as display 2), display 2 (and its lens(es)) can be moved in translation by several micrometers, so as to make it possible to adjust the focal point and the diopter; this makes it possible to at least partially compensate for certain visual defects of the user, such as myopia or hyperopia.

It is possible to provide a system enabling the brightness of display 2 to be adjusted. This system may be associated with an electronic system for capturing the ambient brightness, configured to adjust the brightness of the display in real time according to the external environment.

In an example embodiment, a base 8 sports glasses frame was used, as shown in FIG. 2. The emitting module (a bright monochromatic OLED micro-display with a spectrum centered at 530 nm) was mounted at the bottom portion of the first internal edge, the mirror at the top portion of said first internal edge. The image of display 2 passes through the correction lens 5, then is reflected by the flat mirror to the spectacle lens 4, which reflects up to 20% of the incident light according to the surface deposit applied. The bright (up to 20,000 Cd/m2) and high-contrast (1:970,000) micro-display make it possible to keep a display bright enough to be visible by the user even in an outdoor environment. The high contrast makes it possible to maintain a very dark background (0.003 Cd/m2) outside of the elements displayed on the spectacle lens.

It is also possible to use other spectacle curves, for example base 6, base 7, base 9 and base 13 or other curves and shapes.

Figures 8A, 8B, 8C:
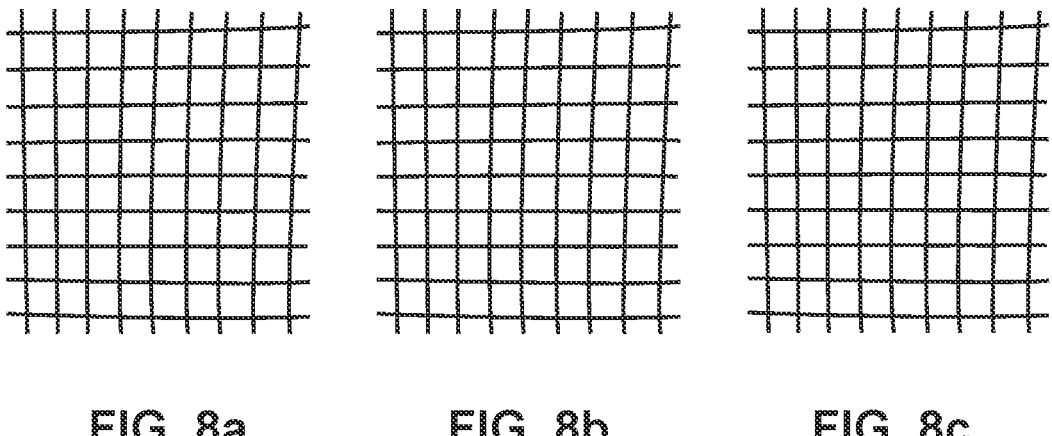
FIGS. 8a-8c show the projection of a quadratic grid on the pupil, obtained with spectacles according to an embodiment of the invention.
Figure 9:
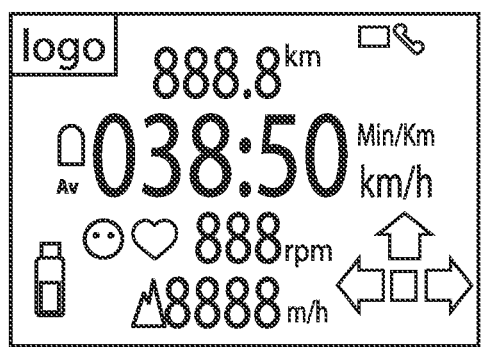
FIG. 9 shows an example of an information display for spectacles obtained with a display system according to the invention provided with an OLED-type display having dimensions of 300×356 pixels (active surface: 3.1 mm×3.6 mm).

It is also possible to use a color OLED display. In one embodiment, a color OLED display with a 3.1 mm×3.6 mm surface with 256×300 pixels and a circular mirror with a diameter of 10 mm was used with sports glasses of the type shown in FIGS. 2 and 6. As optical transformation element 5, two aspherical optical polyester resin lenses OKP4 (optical index n=1.607 at a wavelength of 546.1 nm) were used. FIG. 8 shows the projection of a quadratic grid with a total field of 10° displayed by the display at the nominal point of the pupil (FIG. 8b), at a lateral distance of –2 mm (FIG. 8a) and at a lateral distance of +2 mm (FIG. 8c). It is noted that the image shows very low distortion in the nominal position, and hardly deteriorates when the position is moved by 2±mm. Such a display system is of a very satisfactory quality for displaying alphanumeric signs (text, sequences of digits representing the time, etc.) and images. In this embodiment, the position of the display center is around 160 of horizontal convergence and around 6° of elevation above the horizon. In this position, the user has good direct visibility of the environment without the vision being obstructed by the display, and may also easily recognize the alphanumeric sequences and pictograms that provide information on speed, altitude change, GPS coordinates and so on (see FIG. 9 for an example of a display, reproduced in black and white).

The applicant realized that in the spectacles according to the invention, the image rendering quality of the optical system is rather highly dependent upon the precision of the positioning of optical lenses 5, display 2, mirror 3 and the spectacle lens 4 on which the image is projected. A pivot, an off-centering or stresses and deformations of a few dozen micrometers on the optical block may produce optical aberrations affecting primarily the clearness of the image: these aberrations cause a deflection of the beams and therefore of the focal points in the pupil.

To overcome this problem, three particular embodiments have been proposed, which provide means for positioning optical block 21, 202 with respect to the lens without external stresses that might alter the image rendering quality. A mechanical function has thus been added to the spectacle lens in order to reduce the assembly tolerance.

Figure 10:
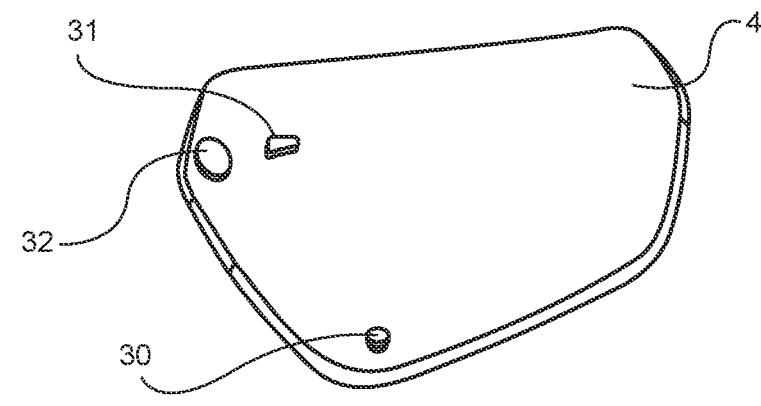
FIG. 10 shows an example of a spectacle lens-type optical unit according to a particular embodiment of the invention.

In a first embodiment, shown in FIG. 10, the aforementioned positioning means include a: least one mechanical positioning element 30, 31, 32 (such as a stop or a rib) formed directly on the spectacle lens 4, thereby facilitating the positioning and the adjustment of optical block 21, 202 (and optionally also mirror 3) against the lens 4 in the optimal position.

These positioning elements 30, 31 may be integrated, in particular integrally molded, with the spectacle lens 4, for example in the form of hyperstatic stops molded on the lens to keep optical block 21, 202 in the nominal position. In this case, optical block 21, 202 has "female"-type extrusions capable of cooperating with these positioning elements. The cooperation of these positioning elements and these female extrusions may in particular be of the mortise and tenon type, or of the resilient snap-lock type. This cooperation makes it possible to hold the entire optical block 21, 202 with sufficient precision with respect to the lens 4. Similarly, it is possible to provide a mechanical positioning element 32 formed directly on the spectacle lens in order to keep mirror 3 in the nominal position.

In a second embodiment, not shown in the figures, at least one base is integrated in the spectacle lens-type optical unit (typically by molding), on which the optical block (and possibly also the mirror) can be precisely attached (for example by snap-locking).

Figure 11:
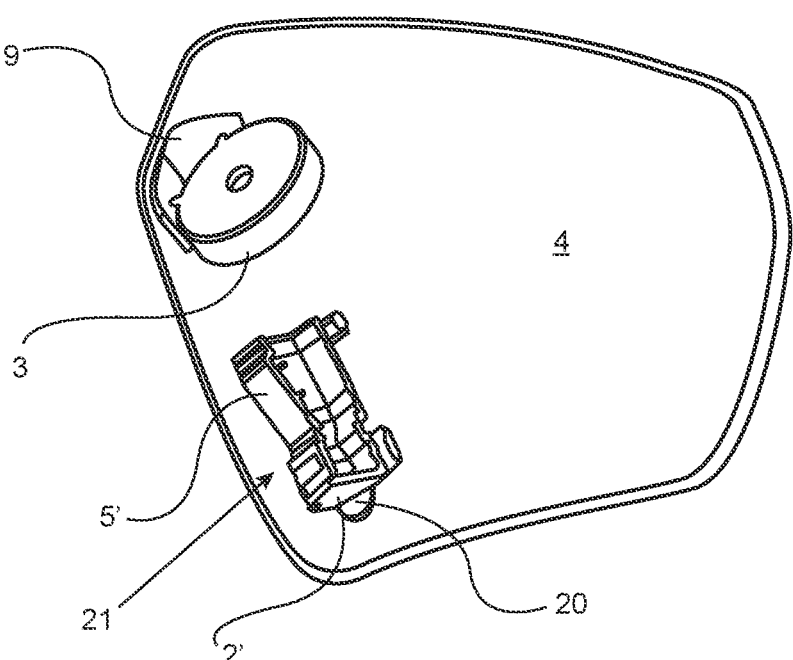
FIG. 11 shows the mirror and (in the cross-section according to a longitudinal axis) the housing that contains the display and the lens, attached to said spectacle lens-type optical unit, according to another particular embodiment of the invention.

In a third embodiment, shown in FIG. 11, optical block 21, 202 is directly integrated with lens-type optical unit 4. This may be performed by molding. In an alternative, it is possible to integrate attachment 9 of the mirror in lens-type optical unit 4. This may be performed by molding.

In particular, it is possible to produce optical block 21, 202 into which display 2 and optical transformation element 5 (including, for example, one or more lenses) are then inserted. This optical block 21, 202 may include a base (not shown in the figure) for attaching geometric reflection element 3. This optical block advantageously includes holding means, in particular removable, that make it possible to hold optical lenses 5 and/or display 2 and/or mirror 3 with respect to the walls of this block. These holding means may be of any suitable type, in particular mortise and tenon, or resilient snap-locking.

These three embodiments described immediately above make it possible to overcome the constraints on adjustment and holding of the mechanical parts because the positioning of the optical elements (display, lenses and mirror) is performed directly on the spectacle lens. In this way, the precision of the positioning of the elements is ensured and the image rendering quality is optimal.

Figure 13:
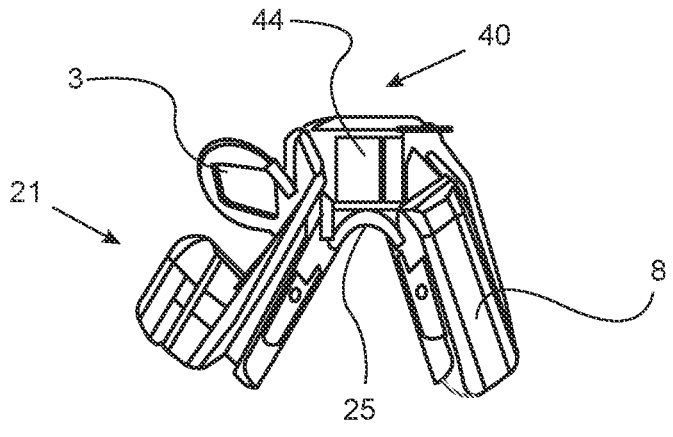
FIG. 13 shows a perspective view of another embodiment in which a bridge module integrates the optical block.
Figures 14A, 14B:
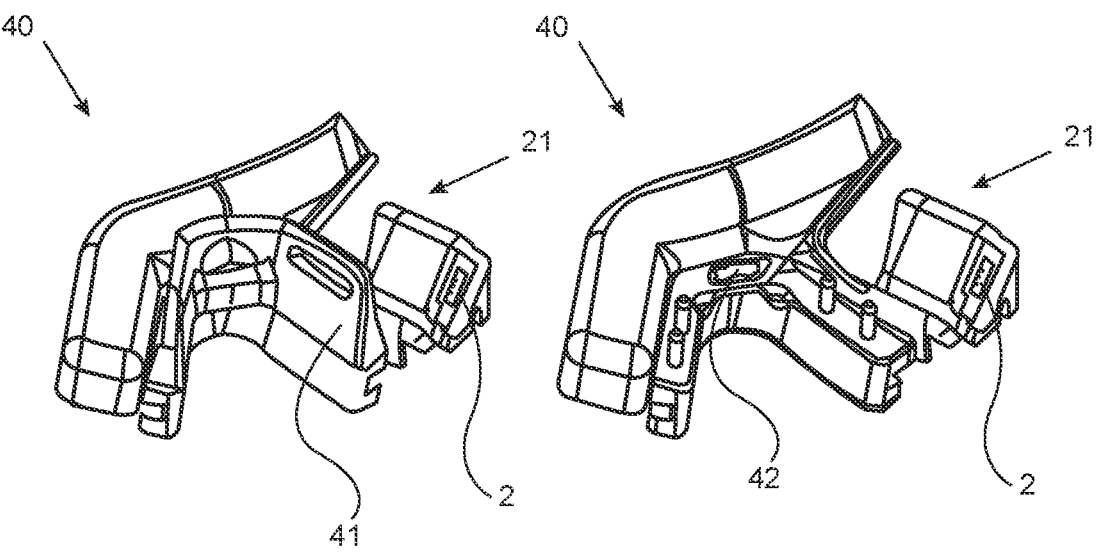
FIG. 14a shows a view of a bridge module integrating an optical module, including the module being shown with a removable nose support on the bridge connector.
FIG. 14b shows a view of a bridge module integrating an optical module, including the module being shown without the nose support.
Figure 15:
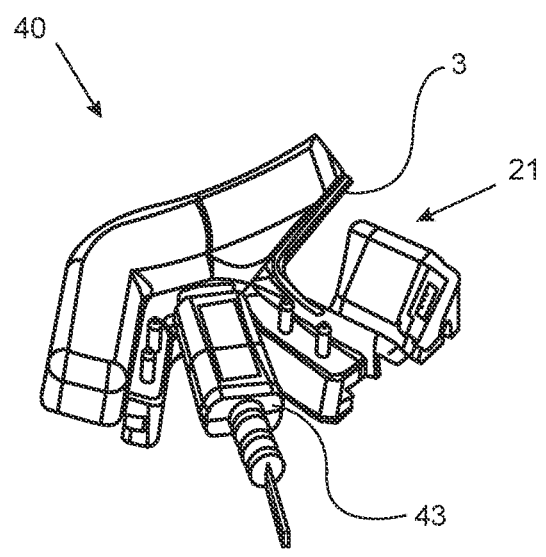
FIG. 15 shows the bridge module of FIG. 14(b) with a connected cable connector.

Another embodiment is shown, with a number of alternatives, in FIGS. 13 to 15. In this embodiment, the bridge of the spectacles integrates optical block 21, 202; this assembly is referred to here as bridge module 40, 201. It includes the electronic housing 8. FIG. 13 shows mirror 3, which is in the top position; in an alternative (not shown in the figures) the optical block is inverted so that the mirror is at the bottom and the display is at the top. FIG. 14 shows two bottom views of bridge module 40, 201; the lower portion of the cap of optical block 21, 202 is not shown so that the position of the OLED display 2 can be shown.

In a very advantageous alternative, the bridge module includes electrical connection socket 42; it is visible in FIG. 14(*b*). It may be protected by removable nose support 41, visible in FIG. 14(*a*). As is shown in FIG. 15, connection socket 42 may receive connector 43 in order to transfer data to the display and/or in order to recharge the battery. It may communicate with an electronic module that may be located in a housing 44 on the bridge and/or in the lateral electronic housing 8 (FIG. 13 shows both simultaneously).

Said electronic module may include at least one microprocessor configured to satisfy at least one of the following functions: management of the electrical power supply and/or of battery recharging, or a wireless communication module function (such as Bluetooth). The electronic module may include a proximity and/or ambient light sensor (and can then be configured to automatically adapt the brightness of the micro-display to the level of ambient light), one or more control elements (such as a pushbutton), one or more signaling elements (such as a light-emitting diode), and a lighting element. The pushbutton or the proximity sensor may be configured to actuate the start/stop function of the micro-display, or another function thereof.

In all of the embodiments described, the support 25 for the nose may be removable so that a support fitting the user's shape can be selected. In an alternative (not shown in the figures), removable nose support 41 is part of bridge support 40, 201.

The spectacles according to the invention have numerous applications and uses, in particular in the professional domain, the sports domain, and city and daily life. These various applications may require an adaptation of the spectacle frame, the shape of the lenses, the precise location of emitting nodule 2 and geometric reflection element 3 (in the top or bottom position with respect to the internal edge in particular), the location of target area 6, and the optical adjustment (apparent distance of the projection). They may also require interfacing of the spectacles with an external microprocessor, for example by wireless communication (for example according to the Bluetooth™ standard).

In the professional domain, spectacles 1 according to the invention may be used by people performing various tasks in a production facility, in a packaging plant, in a warehouse, in a logistics environment: in this case, it involves emitting information to the user and/or guiding the user in the execution of his or her tasks with both hands free. For example, when the user moves in a warehouse with a cart in order to collect packages at different storage stations, the spectacles according to the invention may display the code of the package, and/or the location of the next station. For a production operator, the spectacles may display for the wearer a procedure to be followed in order to carry out operations, or instructions or alert messages to be taken into account.

Spectacles 1 according to the invention may be used by medical or paramedical personnel in a health establishment in order to display useful information for the wearer (product lists, patient information, analysis results, physical, chemical or physicochemical parameters, instructions) without the personnel needing to use their hands in order to handle paper documents or display screens.

Spectacles 1 according to the invention may be used by aviation personnel in order to display important information for controlling the aircraft. As an example, this information may come from the traffic alert and collision avoidance system (TCAS). It may also be used by emergency intervention personnel (firefighters, police officers, technical support) in order to visually notify them of information.

Spectacles 1 according to the invention may be worn by athletes (for example, while running, bicycling, skiing or snowboarding) in order to display useful information for the wearer during the activity, for example, heart rate, speed, distance covered or remaining distance, timekeeping, elevation, geographic, topographic information, etc., including direction indications and GPS data, as well as tourist information (for example, concerning the ski station: closing time of a lift, waiting time, etc.). For diving masks, aside from heart rate information and timekeeping information, the diving depth and information relating to the decompression stops may advantageously be displayed.

Another use of spectacles 1 according to the invention in an athletic context is the use by referees, for example between the central referee and the assistant referee.

In city or daily life, spectacles 1 according to the invention may in particular be used to display timekeeping and geographic information, GPS information, meteorological information, information on air pollution (pollution index), on tourist attractions (monuments, water points, bathroom availability). The spectacles according to the invention may also be used in the context of games, in particular in augmented reality (Pokemon™ GO-type, for example), and to display information on social networks (such as: Twitter™, Facebook™, Instagram™, Snapchat™ WeChat™, WhatsApp™, Line™) or notification or content of email and SMS-type messages).

Figure 16:
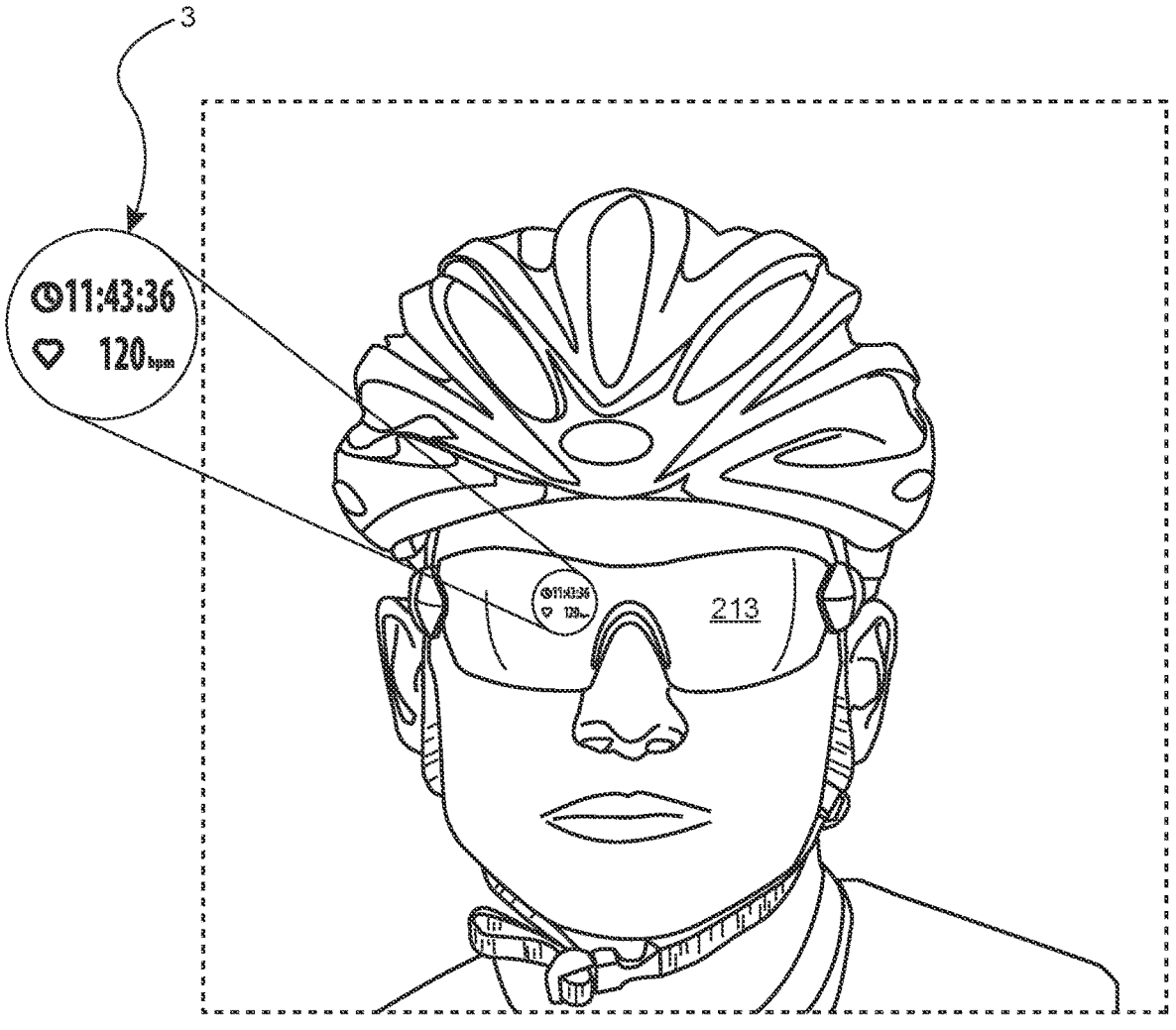
FIG. 16 shows a user wearing a set of spectacles that can display information, such as the user's beats per minute (BPM), heartrate, and/or time, in accordance with one or more embodiments.
Figure 17:
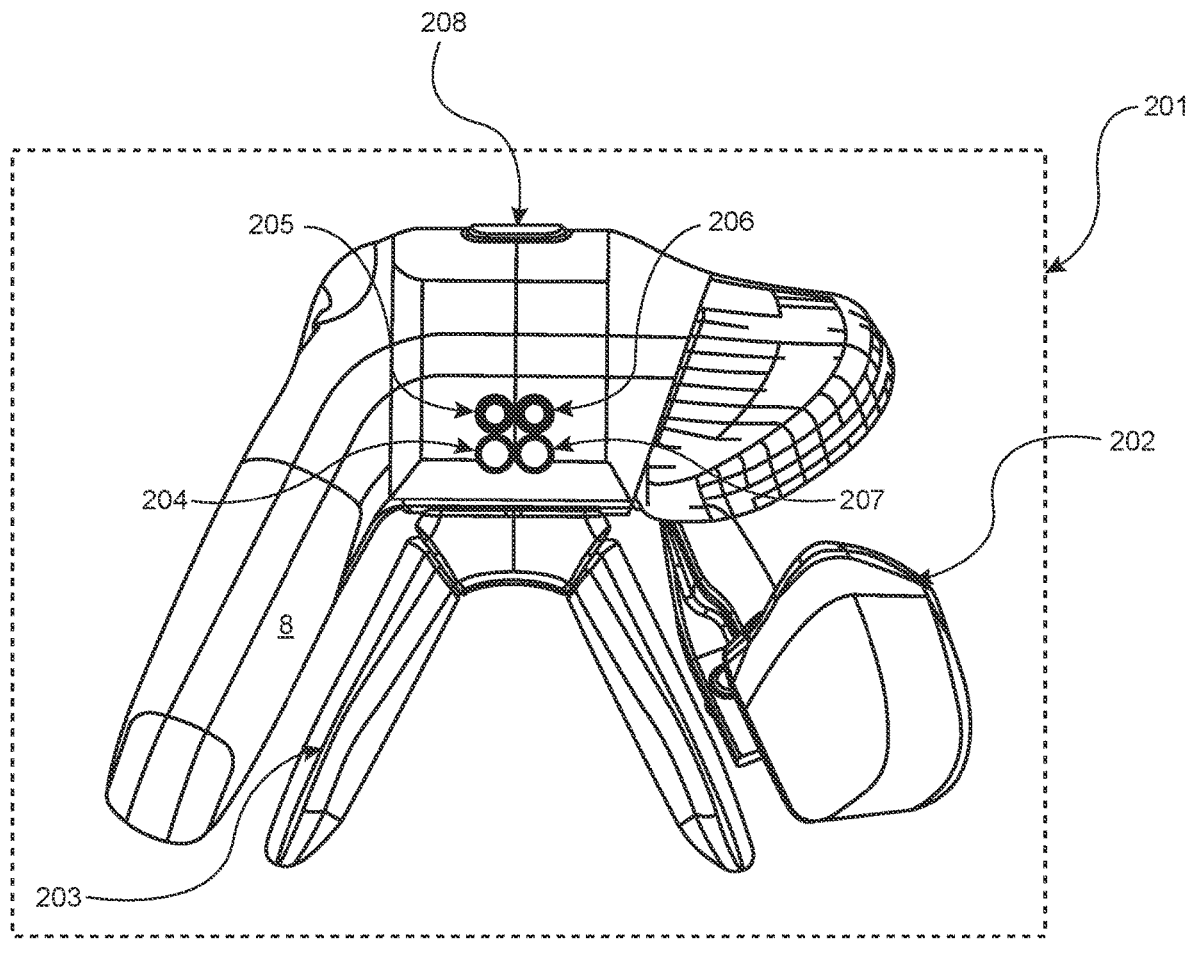
FIG. 17 shows an imaging device that may be removably coupled to the spectacles, in accordance with one or more embodiments.
Figure 18:
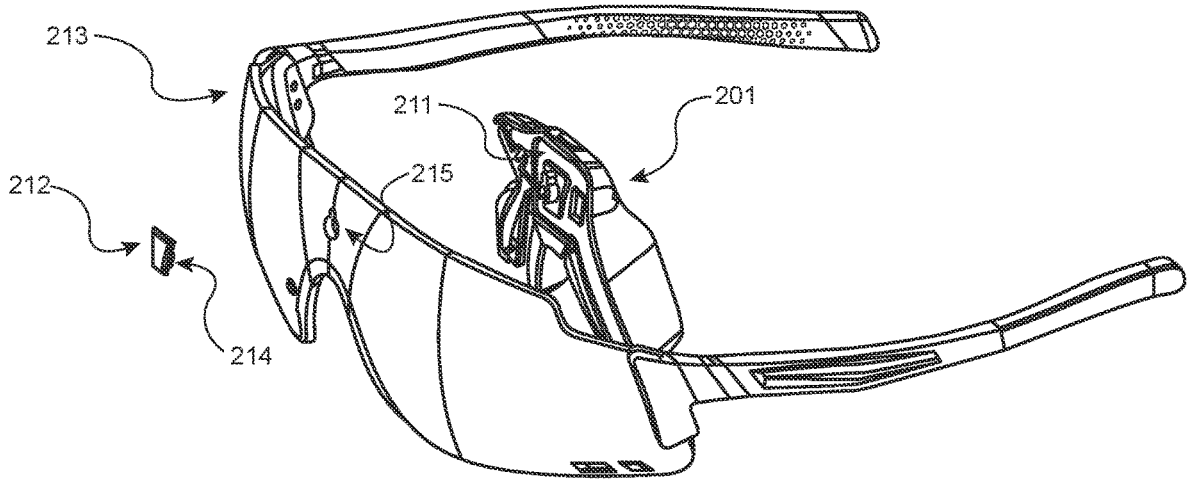
FIG. 18 shows means for removably coupling the electronic module to the spectacles, in accordance with one or more embodiments.

In some embodiments, spectacles 1, 213 may be head-mounted and characterized by mechanical features, as shown in at least FIGS. 16-18. Much if not all contemplated electronics may, in some embodiments, be built into bridge module 201; benefits thereof may accrue, including ease of cleaning, preventive preclusion of dirt affecting any of its connectors, and simplicity when manufacturing the module. For example, no electronics may be included in a frame or lens of contemplated spectacles or sunglasses. In this or another example, module 201 may be an electronic and independent near-eye display module with specific attachment modes, as described herein.

In some embodiments, bridge module 40, 201 may comprise a plurality of parts, e.g., including double-sided tape 211 and/or screw 214, for mounting module 201 to spectacles 1, 213. For example, screw 214 may be used to fasten (or other means, such as an epoxy or Velcro, may be used) to affix the bridge module to a portion (e.g., frame, lens, or other suitable aspect) of spectacles 213, as shown in FIG. 18. FIG. 18 thus depicts an exemplary embodiment, involving a secure snapping (e.g., of mask pin 212 by protrusion 214 extending through opening 215 for mating with structure of module 40, 201). The security of fastening means contemplated herein may all be achieved by locking the electronic module onto the spectacles, enabling a snug fit that satisfies one or more vibration criteria.

FIG. 16 depicts an example of a user wearing a set of spectacles 13, including electronic bridge module 40, 201 and optical block 21 removably coupled thereto, the spectacles being configured to display one or more of media (e.g., pictures, text, and/or video), a date, a time, a measured aspect (e.g., heartrate, temperature, etc.), or another suitable value. For example, the measurement may be performed at a sensor mounted on module 40, 201 and/or block 21 or by another device communicably coupled thereto, which may be configured to display information on a wearable glass.

15                                    16

Figure 21:
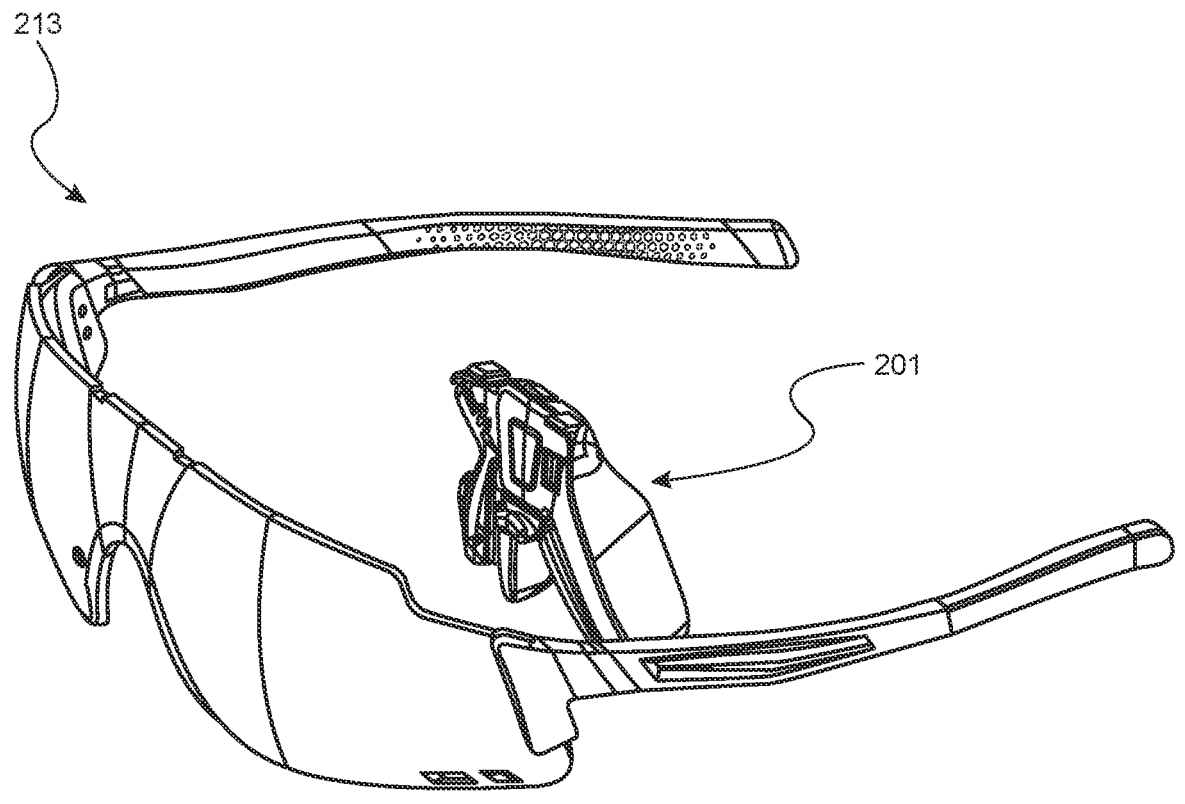
FIGS. 21-23 show a set of fasteners enabling another type of snap connection around a mask, in accordance with one or more embodiments.
Figure 22:
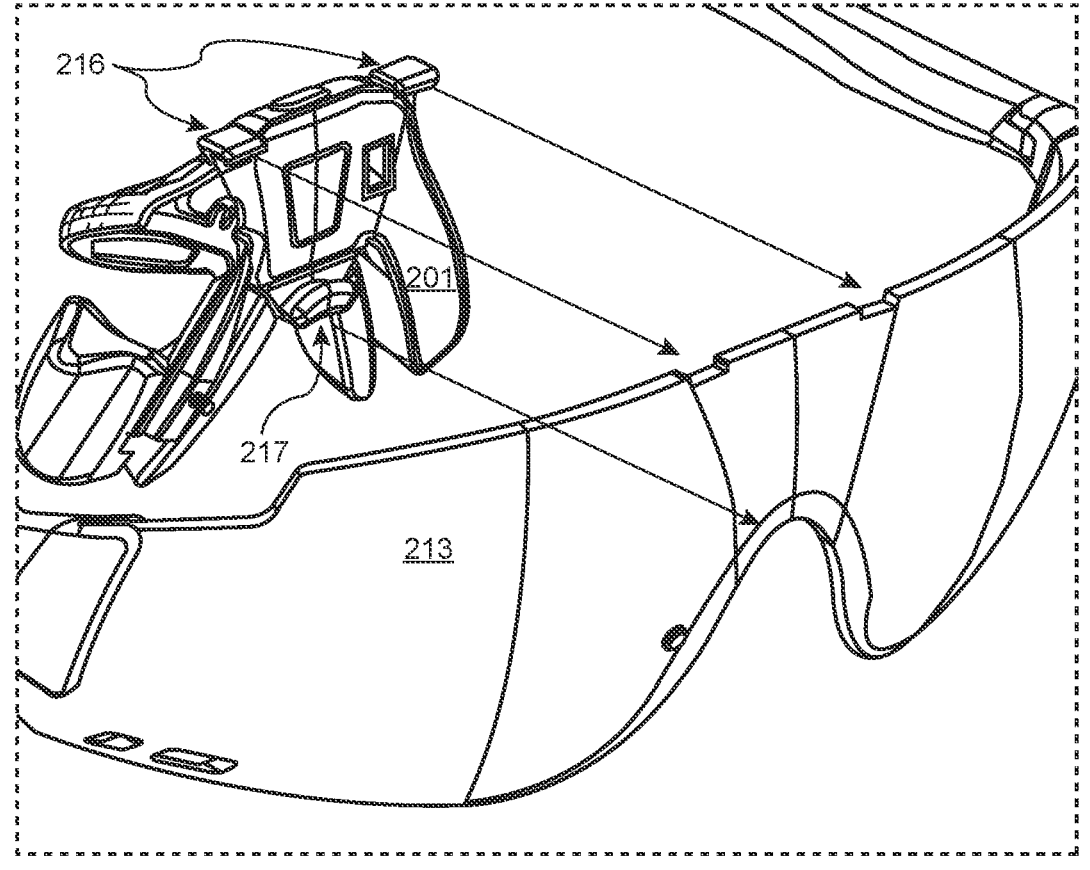
Figure 23:
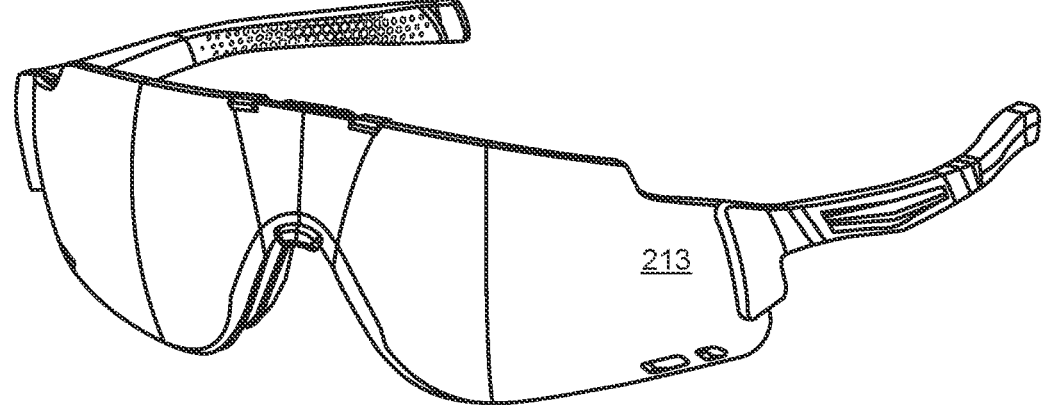

FIG. 17 depicts an exemplary, isometric view of bridge module 40, 201 of imaging device 1, 213. This module may itself comprise optical block 21, in some embodiments. In these or other embodiments, the imaging device may comprise a receiver (e.g., which may be in housing 44 of module 40, 201) of information 3, optical transmitter 21, 202 of information 3, a reflector (e.g., mirror 3), an electronic circuit (e.g., which may be provided in electronic housing 8), a power source (e.g., which may supply power to at least the electronic circuit), and a fastener (e.g., which may be configured to couple the imaging device to a wearable glass of spectacles 213). In these or other embodiments, the coupling may be removably performed at one or more complementary parts associated with the wearable glass. For example, magnet 302 positioned at a portion of mask lens 301 may be used to affix with magnet 304 (e.g., which may have an opposite polarity of magnet 302) and/or magnets 209, 210 of module 40, 201, as shown in the example of FIGS. 19-20 and 24-25. In another example depicted in FIGS. 21-23, a fastener may comprise a plurality of first parts (e.g., snaps 216) positioned at a first edge of module 40, 201, each of first parts 216 being configured for coupling to a second edge of the wearable glass. In this other example or in yet another example, the fastener may comprise one or more second parts 217 positioned at a third edge of module 40, 201, second part 217 being configured to be coupled to a fourth edge of the wearable glass.

Figure 24:
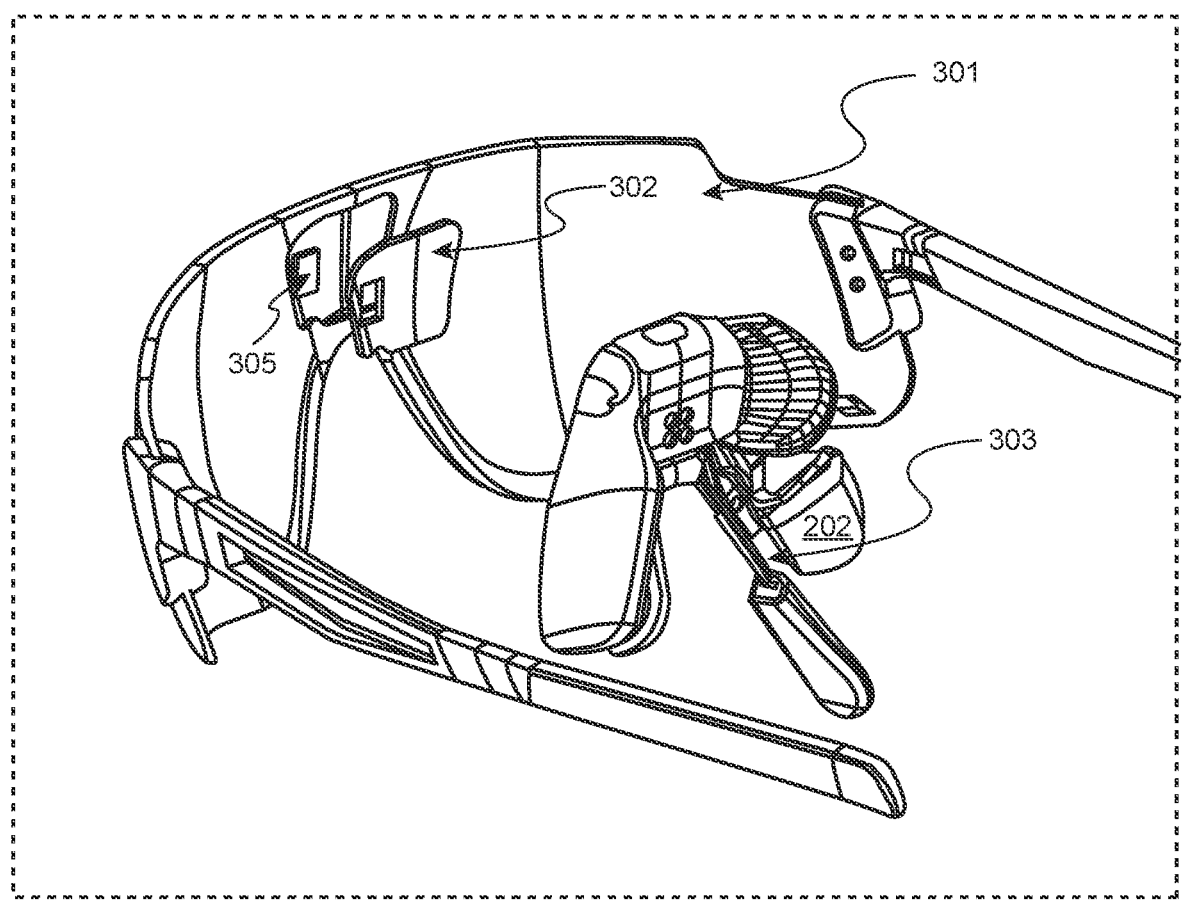
Figure 25:
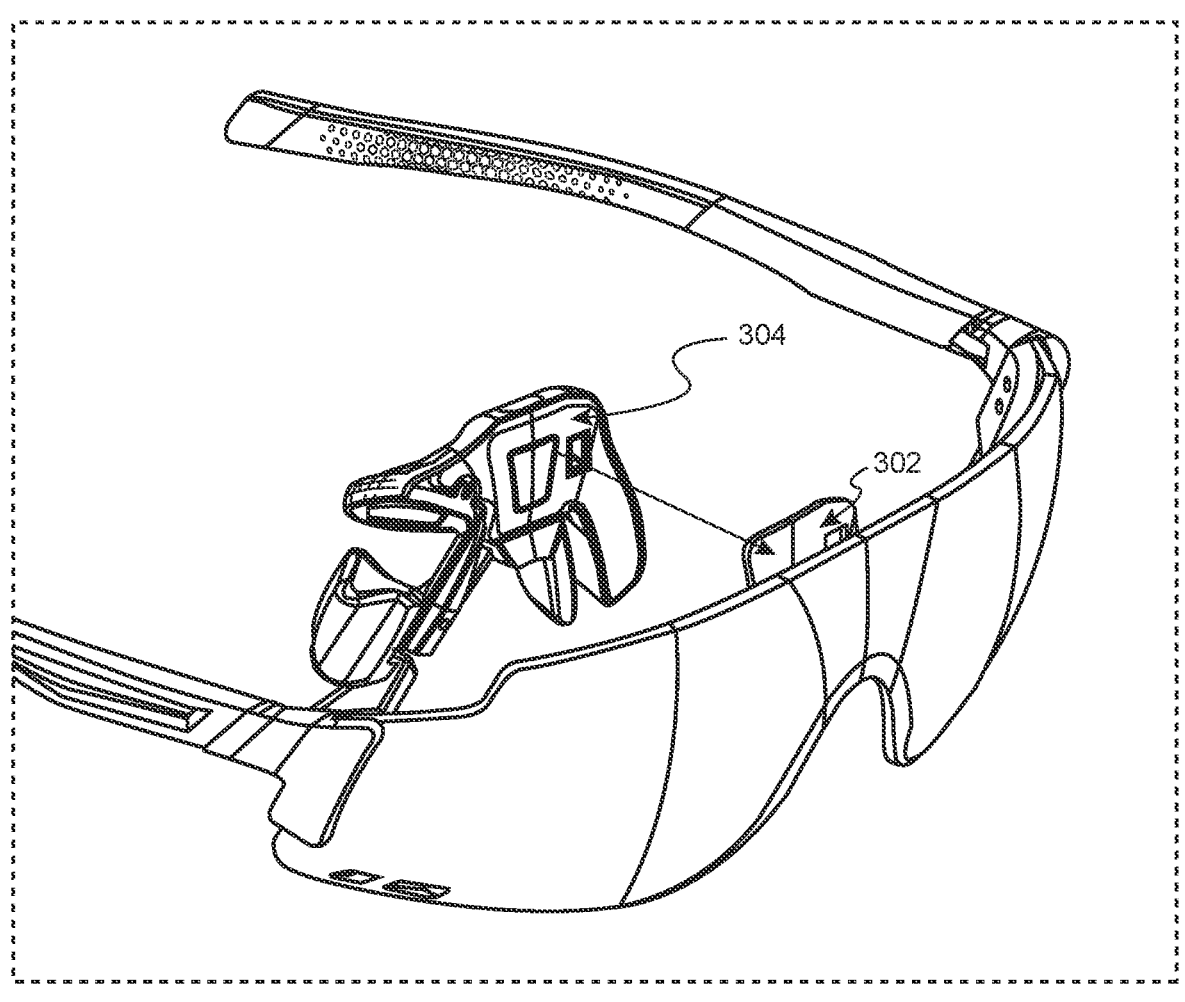

FIG. 24 depicts an example of spectacles 1, 213 having a translucent lens through which light may pass through to a sensor of bridge module 40, 201 and/or optical block 21, 202, e.g., including at least one of one or more hues, infrared, or ultraviolet frequencies of ambient light. For example, imaging device 40, 201 may be configured for displaying information on a wearable glass. This imaging device may have a receiver of the information, an optical transmitter of the information and/or a reflector, an electronic circuit and/or a power source, a detector, and a fastener configured to couple the imaging device to the wearable glass. This coupling may be removably performed at one or more complementary parts associated with the wearable glass, and the fastener may comprise metal plate 302 configured to be magnetically coupled to the one or more complementary parts. In this or another example, imaging device 40, 201 may comprise a detector of a contact with the wearable device, an activation thereof causing the metal plate to enter a holding state.

In some embodiments, metal plate 302 may comprise one or more openings, as shown in FIG. 24 and as may be needed to securely mate with protrusion 305 of mask lens 301. For example, protrusion 305 may be configured to removably couple to the one or more openings such that a substantially rigid connection is caused. And each of the one or more protrusions may be configured to pass light therethrough to one or more sensors of bridge module 40, 201.

FIG. 24 further depicts nose detector 303, e.g., which may detect that mask lens 301 or another set of eyeglasses is worn. In an example, the detection may switch the imaging device on. In an example, a capacitive sensor or an electrostatic potential sensor may be used to detect human contact with the nose pads. This information may be used to automatically change the state of the system (on/off for example).

What is claimed is:

1. An imaging device for displaying information on a wearable glass, the imaging device comprising:

a receiver of the information;

at least one of an optical transmitter of the information or a reflector;

at least one of an electronic circuit or a power source;

a detector;

one or more sensors; and a fastener configured to couple the imaging device to the wearable glass, wherein the coupling is removably performed at one or more complementary parts associated with the wearable glass, wherein:

the fastener comprises a metal plate configured to be magnetically coupled to the one or more complementary parts;

the metal plate comprises one or more openings; and the wearable glass comprises one or more protrusions configured to removably couple to the one or more openings such that a substantially rigid connection is caused, each of the one or more protrusions being configured to pass light therethrough to the one or more sensors.

2. The imaging device of claim 1, wherein one or more of the imaging device or the wearable glass comprises a sensor configured to detect that an assembly of the imaging device and the wearable device is worn by a user, and wherein the electronic circuit is configured to switch the imaging device on responsive to the assembly being detected to be worn.

3. The imaging device of claim 2, wherein the sensor is one of a capacitive sensor or an electrostatic potential sensor.

4. The imaging device of claim 1, wherein the fastener further comprises a plurality of first parts positioned at a first edge of the imaging device, and wherein each of the first parts is configured to be coupled to a second edge of the wearable glass.

5. The imaging device of claim 4, wherein the fastener further comprises a second part positioned at a third edge of the imaging device, the third edge being different from the first edge, and wherein the second part is configured to be coupled to a fourth edge of the wearable glass.

6. The imaging device of claim 1, wherein the fastener further comprises a magnet configured to be magnetically coupled to the one or more complementary parts.

7. The imaging device of claim 1, wherein one or more of the imaging device or the wearable device comprise a sensor configured to detect that an assembly of the imaging device and the wearable device is worn by a user, and wherein the electronic circuit is configured to switch the imaging device on responsive to the assembly being detected to be worn.

8. The imaging device of claim 7, wherein the sensor is one of a capacitive sensor or an electrostatic potential sensor.

9. The imaging device of claim 1, wherein the receiver is a wireless receiver.

10. The imaging device of claim 1, wherein the wearable glass comprises means for removably coupling the wearable glass to one or more portions of a user.

* * * * *